United States Patent
Murphy et al.

(10) Patent No.: US 10,148,550 B1
(45) Date of Patent: Dec. 4, 2018

(54) METHODS AND APPARATUS FOR A SCALABLE NETWORK WITH EFFICIENT LINK UTILIZATION

(75) Inventors: James Murphy, Alameda, CA (US); Nischal Sheth, Los Altos, CA (US); Abhijit Choudhury, Cupertino, CA (US); Raghavendra Mallya, Cupertino, CA (US); Pranay Pogde, Sunnyvale, CA (US); Phalguni Nanda, San Jose, CA (US); Jayabharat Boddu, Los Altos, CA (US); Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/618,684

(22) Filed: Sep. 14, 2012

Related U.S. Application Data

(63) Continuation-in-part of application No. 13/252,857, filed on Oct. 4, 2011.

(51) Int. Cl.
  *H04L 12/721* (2013.01)
  *H04W 88/04* (2009.01)

(52) U.S. Cl.
  CPC .......... *H04L 45/12* (2013.01); *H04W 88/04* (2013.01)

(58) Field of Classification Search
  CPC ..... H04W 88/04; H04W 88/08; H04W 80/04; H04L 45/12
  USPC .................................................. 370/328, 338
  See application file for complete search history.

(56) References Cited

U.S. PATENT DOCUMENTS

| | | |
|---|---|---|
| 6,970,459 B1 | 11/2005 | Meier |
| 7,068,624 B1 | 6/2006 | Dantu et al. |
| 7,792,985 B2 | 9/2010 | Liu |
| 7,992,201 B2 * | 8/2011 | Aldridge et al. ............ 726/15 |
| 8,233,455 B2 | 7/2012 | Shaheen et al. |
| 2002/0071427 A1 | 6/2002 | Schneider et al. |

(Continued)

FOREIGN PATENT DOCUMENTS

| | | |
|---|---|---|
| CN | 1825798 A | 8/2006 |
| CN | 101674249 A | 3/2010 |

(Continued)

OTHER PUBLICATIONS

Michael Bahr, "Update on the Hybrid Wireless Mesh Protocol of IEEE 802.11s," Siemens Corporate Technology, Information & Communications, IEEE 1-4244-1455-5/07, ©2007, 6 pages.

(Continued)

*Primary Examiner* — Michael Thier
*Assistant Examiner* — Brian P Cox
(74) *Attorney, Agent, or Firm* — Cooley LLP

(57) ABSTRACT

In some embodiments, an apparatus includes a network node configured to be included in a set of network nodes operatively coupled to a core network node. The network node is configured to receive a first packet and a second packet from a host device operatively coupled to the network node. The network node is configured to send the first packet to the core network node via a first path of a tunnel between the network node and the core network node. The first path of the tunnel has a first cost. The network node is configured to send the second packet to the core network node via a second path of the tunnel. The second path has a second cost different than the first cost.

18 Claims, 7 Drawing Sheets

(56) References Cited

U.S. PATENT DOCUMENTS

| | | | |
|---|---|---|---|
| 2002/0191572 | A1 | 12/2002 | Weinstein et al. |
| 2002/0194367 | A1 | 12/2002 | Nakamura et al. |
| 2004/0264388 | A1 | 12/2004 | Rover et al. |
| 2005/0050390 | A1 | 3/2005 | Vakil et al. |
| 2005/0265365 | A1 | 12/2005 | Wan |
| 2007/0153738 | A1 | 7/2007 | Barker, Jr. et al. |
| 2007/0206537 | A1 | 9/2007 | Cam-Winget et al. |
| 2007/0250713 | A1 | 10/2007 | Rahman et al. |
| 2007/0253432 | A1 | 11/2007 | Regale et al. |
| 2007/0268878 | A1 | 11/2007 | Clements |
| 2008/0107070 | A1 | 5/2008 | Sastry |
| 2008/0225853 | A1 | 9/2008 | Melman et al. |
| 2008/0259938 | A1* | 10/2008 | Keene et al. ................. 370/400 |
| 2009/0059848 | A1 | 3/2009 | Khetawat et al. |
| 2009/0073989 | A1 | 3/2009 | Cai et al. |
| 2009/0161590 | A1 | 6/2009 | Lewis |
| 2009/0201898 | A1 | 8/2009 | Gong et al. |
| 2009/0252133 | A1 | 10/2009 | Watanabe et al. |
| 2009/0303880 | A1 | 12/2009 | Maltz et al. |
| 2009/0310535 | A1 | 12/2009 | Anumala et al. |
| 2009/0316604 | A1* | 12/2009 | Singh .................... H04W 68/00 370/254 |
| 2010/0054207 | A1 | 3/2010 | Gupta et al. |
| 2010/0057907 | A1 | 3/2010 | Ross et al. |
| 2010/0080200 | A1 | 4/2010 | Stewart |
| 2010/0180016 | A1 | 7/2010 | Bugwadia et al. |
| 2010/0189118 | A1* | 7/2010 | Nonaka .......................... 370/401 |
| 2010/0246545 | A1 | 9/2010 | Berzin |
| 2010/0250733 | A1 | 9/2010 | Turanyi et al. |
| 2010/0260146 | A1 | 10/2010 | Lu |
| 2010/0281251 | A1 | 11/2010 | Arauz Rosado |
| 2010/0290398 | A1* | 11/2010 | Choudhary et al. .......... 370/328 |
| 2010/0293293 | A1* | 11/2010 | Beser ............................ 709/238 |
| 2010/0306408 | A1 | 12/2010 | Greenberg et al. |
| 2011/0103284 | A1 | 5/2011 | Gundavelli et al. |
| 2011/0116442 | A1 | 5/2011 | Caldwell et al. |
| 2011/0117946 | A1* | 5/2011 | Vainola ................. H04W 28/08 455/509 |
| 2011/0134797 | A1 | 6/2011 | Banks et al. |
| 2011/0161657 | A1 | 6/2011 | So |
| 2011/0182172 | A1 | 7/2011 | Kulkarni |
| 2011/0270996 | A1 | 11/2011 | Kim et al. |
| 2012/0063451 | A1 | 3/2012 | Keesara et al. |
| 2012/0198516 | A1 | 8/2012 | Lim |
| 2012/0198518 | A1 | 8/2012 | Faith et al. |
| 2012/0236801 | A1* | 9/2012 | Krishnaswamy ... H04W 76/026 370/329 |
| 2013/0028079 | A1 | 1/2013 | Paredes |
| 2013/0083691 | A1 | 4/2013 | Murphy et al. |
| 2013/0083700 | A1 | 4/2013 | Sindhu et al. |
| 2013/0083724 | A1 | 4/2013 | Sindhu et al. |
| 2013/0083725 | A1 | 4/2013 | Mallya et al. |
| 2013/0083782 | A1 | 4/2013 | Murphy et al. |

FOREIGN PATENT DOCUMENTS

| | | |
|---|---|---|
| CN | 101888625 A | 11/2010 |
| EP | 2252096 A1 | 11/2010 |
| WO | 2010068018 A2 | 6/2010 |
| WO | 2011056334 A1 | 5/2011 |

OTHER PUBLICATIONS

Myung J. Lee et al., Wireless Mesh Networking, "Emerging Standards for Wireless Mesh Technology," IEEE Wireless Communications, Apr. 2006 (pp. 56-63).

Krishna Sankar et al. "Cisco Wireless LAN Security Expert guidance for securing your 802.11 networks," Chapter 9, SWAN: End-to-End Security Deployment, Copyright 2005, Cisco Systems, Inc., Cisco Press, pp. 233-253.

Tarek Saad et al. "Tunneling Techniques for End-to-End VPNs: Generic Deployment in an Optical Testbed Environment" Broadband Networks, 2005 2nd International Conference, Boston, MA, Oct. 3-7, 2005, IEEE, Oct. 3, 2005, ISBN 978-0/7803-9276-2, pp. 924-930.

Albert Greenberg et al. "Towards a Next Generation Data Center Architecture: Scalability and Commoditization" SIGCOMM '08: Proceedings of the 2008 SIGCOMM Conference and Co-Located Workshops NSDR'08, WOSN'08, MOBIARCH'08, NETECON'08,& PRESTO'08; Seattle, WA, Aug. 17-22, 2008, New York, NY: ACM, Aug. 17, 2008, ISBN: 978-1-60558-181-1, pp. 57-62.

Greenberg A. et al "VL2: a scalable and flexible data center network," SIGCOMM 2009, Aug. 17-21, 2009, Barcelona, Spain, ACM, New York, NY, ISBN: 978-1-60558-594-9, vol. 39, No. 4, Aug. 17, 2009, pp. 51-62.

Linda Dunbar: "Directory Server Assisted TRILL edge", Mar. 7, 2011, Retrieved from the internet: URL:<http://tools.jetf.org/pdf/draft-dunbar-trill-server-assisted-edge-00.pdf> [Retrieved on Sep. 30, 2011], 7 pages.

Extended Search Report for European Application No. 12169451.7, dated Dec. 12, 2012.

Office Action for U.S. Appl. No. 13/252,854, dated Apr. 9, 2013.

Office Action for U.S. Appl. No. 13/252,852, dated Apr. 23, 2013.

Office Action for U.S. Appl. No. 13/252,854, dated Sep. 30, 2013.

Office Action for U.S. Appl. No. 13/252,856, dated Oct. 11, 2013.

Final Office Action for U.S. Appl. No. 13/252,852, dated Oct. 25, 2013.

Extended Search Report for European Application No. 12168436.9 dated Oct. 25, 2013.

Non-Final Office Action for U.S. Appl. No. 13/252,857, dated Dec. 13, 2013.

Office Action for European Patent Application No. 12169903.7 dated Jun. 3, 2014.

Final Office Action for U.S. Appl. No. 13/252,857, dated Jul. 25, 2014.

Office Action for U.S. Appl. No. 13/252,852, dated Aug. 5, 2014.

Extended Search Report for European Application No. 12169903.7, dated Jan. 7, 2013.

Final Office Action for U.S. Appl. No. 13/252,854, dated Jun. 3, 2014.

First Office Action for Chinese Application No. 201210174345.X, dated Dec. 1, 2014.

Office Action for U.S. Appl. No. 14/454,193, dated Jan. 7, 2015.

Office Action for U.S. Appl. No. 13/252,860, dated Jan. 16, 2015.

First Office Action for Chinese Application No. 201210173641.8, dated Feb. 12, 2015.

Final Office Action for U.S. Appl. No. 13/252,852, dated Feb. 23, 2015.

Final Office Action for U.S. Appl. No. 13/252,860, dated Jul. 1, 2015.

Office Action for U.S. Appl. No. 13/252,852, dated Jul. 13, 2015.

Office Action for U.S. Appl. No. 13/252,854, dated Jul. 14, 2015.

* cited by examiner

| Identifier Table 600 | |
|---|---|
| IP Address 620 | MAC Address 640 |
| 192.168.10.1 | 01:23:45:67:89:ab |
| 192.168.20.x | 11:22:33:44:55:66 |
| 192.168.10.100 | |
| | |

METHODS AND APPARATUS FOR A SCALABLE NETWORK WITH EFFICIENT LINK UTILIZATION

CROSS-REFERENCE TO RELATED APPLICATIONS

This application is a continuation-in-part of U.S. patent application Ser. No. 13/252,857, filed Oct. 4, 2011 and entitled "Methods and Apparatus for a Scalable Network with Efficient Link Utilization," which is incorporated herein by reference in its entirety.

This application is also related to co-pending U.S. patent application Ser. No. 13/252,852, filed Oct. 4, 2011, and entitled "Methods and Apparatus for a Converged Wired/Wireless Enterprise Network Architecture," U.S. patent application Ser. No. 13/252,856, filed Oct. 4, 2011, and entitled "Methods and Apparatus for Enforcing a Common User Policy within a Network;" U.S. patent application Ser. No. 13/252,860, filed Oct. 4, 2011, and entitled "Methods and Apparatus for Centralized Management of Access and Aggregation network Infrastructure;" U.S. patent application Ser. No. 13/252,854, filed Oct. 4, 2011, and entitled "Methods and Apparatus for a Self-organized Layer-2 Enterprise Network Architecture," each of which is incorporated herein by reference in its entirety.

BACKGROUND

Some embodiments described herein relate generally to enterprise networks, and, in particular, to methods and apparatus for efficiently using links in a scalable enterprise network architecture.

In some known enterprise networks, certain control traffic including DHCP requests, ARP requests, etc., is broadcast or flooded throughout an enterprise network such that various types of control information can be obtained for user devices. These broadcast and/or flood mechanisms, however, result in a scaling limitation to the enterprise network because as the enterprise network grows, such broadcast and/or flooded traffic consumes a significant fraction of the overall network capacity. This consumption often makes the enterprise network inefficient for transmitting data traffic.

Moreover, in some known enterprise networks, redundant links between nodes are not used. Such known enterprise networks do not use redundant links to avoid an unending loop within the network. Use of redundant links, however, can be beneficial to the performance of enterprise networks.

Accordingly, a need exists for an enterprise network architecture that can eliminate or reduce broadcast and/or flooded traffic and efficiently use links within the enterprise network.

SUMMARY

In some embodiments, an apparatus includes a network node configured to be included in a set of network nodes operatively coupled to a core network node. The network node is configured to receive a first packet and a second packet from a host device operatively coupled to the network node. The network node is configured to send the first packet to the core network node via a first path of a tunnel between the network node and the core network node. The first path of the tunnel has a first cost. The network node is configured to send the second packet to the core network node via a second path of the tunnel. The second path has a second cost different than the first cost.

DETAILED DESCRIPTION

Figure 1:
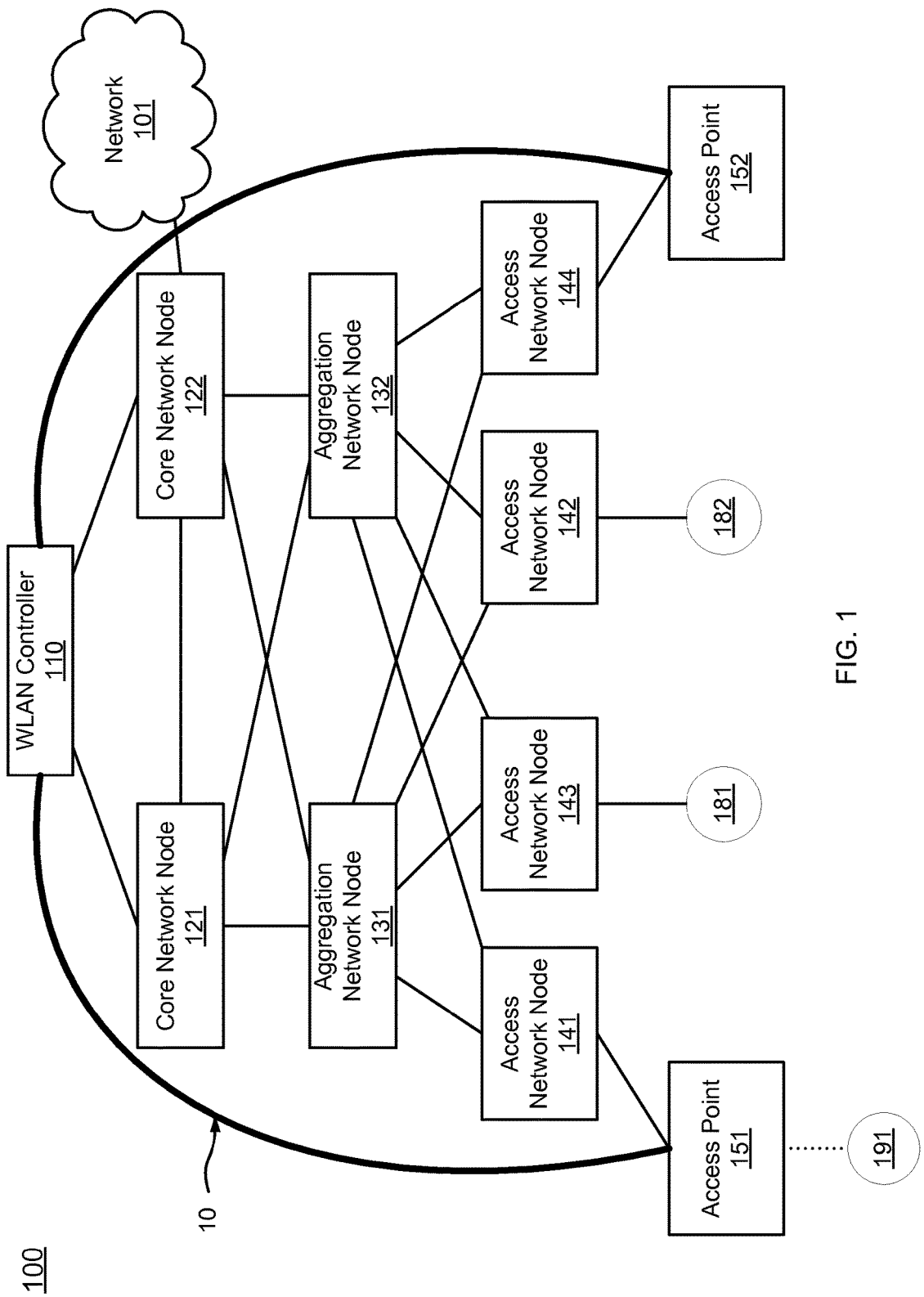
FIG. 1 is a schematic illustration of an overlay enterprise network having access points, access network nodes, aggregation network nodes, core network nodes, and a WLAN controller.

In some embodiments, an apparatus includes a network node configured to be included in a set of network nodes operatively coupled to a core network node. The network node is configured to receive a first packet and a second packet from a host device operatively coupled to the network node. The network node is configured to send the first packet to the core network node via a first path of a tunnel between the network node and the core network node. The first path of the tunnel has a first cost. The network node is configured to send the second packet to the core network node via a second path of the tunnel. The second path has a second cost different than the first cost. In some embodiments, a cost of a path can be determined based on a bandwidth of the path, a number of nodes included in or traversed by the path, a time to transmit a data packet via the path, and/or the like.

In some embodiments, an apparatus includes a network node configured to be operatively coupled to a set of host devices without an intervening switch. The network node is configured to be operatively coupled to a core network node. The network node is configured to receive a first packet from a first host device from the set of host devices and addressed to a second host device from the set of host devices. The network device is configured to send the first packet to the second host device without sending the first packet to the core network node. The network node is configured to receive a second packet from the first host device from the set of host devices and addressed to a host device not within the set of host devices. The network node is configured to send the second packet to the core network node via a tunnel between the network node and the core network node. In such embodiments, the network node stores identifiers and/ or addresses associated with the host devices from the set of host devices as well as the identifier and/or address associated with the tunnel and/or the core network node. In such embodiments, the identifiers and/or addresses of the other network nodes and/or host devices within the network are not stored at the network node.

In some embodiments, an enterprise network includes a core network node operatively coupled to a set of network nodes, which includes a set of wired network nodes and a set of wireless network nodes. A network node from the set of network nodes is configured to receive a broadcast signal from a host device operatively coupled to the network node. The network node is then configured to send the broadcast signal to the core network node via a tunnel such that network nodes from the set of network nodes that are not included in the tunnel do not receive the broadcast signal. The broadcast signal can be sent via a multiprotocol label switching (MPLS) tunnel or an Ethernet-over-layer-3 tunnel that includes an aggregation network node from the set of network nodes operatively coupled between the core network node and the network node. Moreover, the broadcast signal can be sent via one path from multiple paths included within the tunnel. In response to receiving the broadcast signal, the core network node is configured to retrieve control information associated with the broadcast signal without sending another broadcast signal, and then send the retrieved control information to the network node.

In some embodiments, the broadcast signal sent from the network node to the core network node can be an address resolution protocol (ARP) signal requesting a media access control (MAC) address associated with an internet protocol (IP) address. In such embodiments, the core network node is configured to retrieve the control information from a database that includes an association between the MAC address of the host device and the IP address of the host device. In some embodiments, the broadcast signal sent from the network node to the core network node can be a dynamic host configuration protocol (DHCP) request. In such embodiments, the core network node is configured to send a unicast signal to a DHCP server to retrieve an IP address associated with the host device. In some embodiments, the broadcast signal sent from the network node to the core network node can be a multicast signal that causes neighbor discovery (ND) to be performed (also referred to as an ND request). Such ND can be include performing link-layer address resolution. In other words, the multicast signal (or ND request) can request a media access control (MAC) address associated with an internet protocol (IP) address. ND can also be used to perform duplicate address detection (e.g., determine whether any other network node has the same IP address as the IP address included in the multicast signal). In such embodiments, the core network node, in response to the multicast signal (or ND request), retrieves the control information from a database that includes an association between the MAC address of the host device and the IP address of the host device, or information about the IP addresses assigned to other network nodes or host devices. In some embodiments, the host device can be a wired host device and the network node can be an access network node, where the wired host device is directly coupled to the access network node.

In some embodiments, an enterprise network includes a non-transitory processor-readable medium that stores code representing instructions for a processor of a network node that can be included in a set of network nodes. The instructions can cause the processor to receive a broadcast signal from a host device operatively coupled to the network node, which requests control information for the host device. In some embodiments, the host device can be a wired host device and the network node can be an access network node, where the wired host device is directly coupled to the access network node. In some other embodiments, the host device can be a wireless host device and the network node can be a wireless access point, where the wireless host device is wirelessly coupled to the wireless access point.

In response to the network node receiving the broadcast signal, the instructions can cause the processor to send the broadcast signal to a core network node via a tunnel such that the core network node retrieves the control information without sending another broadcast signal. Furthermore, network nodes from the set of network nodes that are not included in the tunnel do not receive the broadcast signal. In some embodiments, the broadcast signal can be sent from the network node to the core network node via a MPLS tunnel or an Ethernet-over-layer-3 tunnel that includes an aggregation network node from the set of network nodes operatively coupled between the core network node and the network node. Next, the instructions can cause the processor to receive the control information from the core network node, and then send the control information to the host device.

In some embodiments, the broadcast signal sent from the network node to the core network node can be a DHCP request, which is configured to cause the core network node to send a unicast signal to a DHCP server to retrieve an IP address associated with the host device. In some embodiments, the broadcast signal sent from the network node to the core network node can be an ARP signal requesting a MAC address associated with an IP address. In such embodiments, the broadcast signal can be configured to cause the core network node to access an association between the MAC address and the IP address. Alternatively, the broadcast signal can be configured to cause the core network node to send a multicast request to each IP address not associated with a MAC address at the core network node to determine the MAC address associated with the IP address. In some embodiments, the broadcast signal sent from the network node to the core network node can be a multicast signal that causes neighbor discovery (ND) to be performed (also referred to as an ND request). Such ND can be include performing link-layer address resolution. In other words, the multicast signal (or ND request) can request a media access control (MAC) address associated with an internet protocol (IP) address. ND can also be used to perform duplicate address detection (e.g., determine whether any other network node has the same IP address as the IP address included in the multicast signal). In such embodiments, the core network node, in response to the multicast signal (or ND request), retrieves the control information from a database that includes an association between the MAC address of the host device and the IP address of the host device, or information about the IP addresses assigned to other network nodes or host devices.

FIG. 1 is a schematic illustration of an overlay enterprise network 100 having access points (e.g., access point 151, access point 152), access network nodes (e.g., access network node 141-144), aggregation network nodes (e.g., aggregation network node 131, aggregation network node 132), core network nodes (e.g., core network node 121, core network node 122), and a WLAN (wireless local area network) controller 110. In such an overlay enterprise network, some signals requesting control information (e.g., DHCP requests, ARP requests, ND requests) for one or more host devices are typically broadcast to all network entities within the overlay enterprise network 100, such that the control information associated with the request signals can be retrieved and sent to the host devices. The broadcast mechanisms for the request signals including DHCP requests, ARP requests and ND requests are described in detail below.

A core network node (e.g., core network node 121, core network node 122) can be a high-capacity switching device positioned in the physical core, or backbone, of an enterprise network (e.g., the overlay enterprise network 100). In some cases, a core network node is also known as a core switch, a tandem switch or a backbone switch. In the overlay enterprise network 100, core network node 121 and core network node 122 are configured to connect the access devices (e.g., access network node 141-144, access point 151-152) and WLAN controller 110 with network 101, such that access to information services (e.g., persistent data and applications) located at network 101 can be provided to users that are coupled to the overlay enterprise network 100 via wired or wireless host devices (e.g., wired host device 181, wired host device 182, wireless host device 191). Specifically, core network node 121 and core network node 122 operatively connect aggregation network node 131 and aggregation network node 132 with network 101, and forward packets of wired and/or wireless sessions between aggregation network node 131, aggregation network node 132 and network 101 based on IP routing services. In other words, core network node 121 and core network node 122 act as a router working in layer 3 (i.e., network layer) of the open systems interconnection (OSI) model for the overlay enterprise network 100. In the overlay enterprise network 100, the access network nodes manage the wired sessions, core network nodes are configured to switch or route wired sessions' traffic received from the aggregation network node(s), while wireless sessions are managed by WLAN controller 110, as described in detail below.

Shown in FIG. 1, network 101 can be any network that is directly connected to the overlay enterprise network 100 through one or more core network nodes. For example, network 101 can be a data center network including one or more data servers that provide information services. For another example, network 101 can be a WAN (wide area network) access network that is used to connect the overlay enterprise network 100 to remote data resources. For yet another example, network 101 can be the Internet. Typically, the overlay enterprise network 100 acts as an access network providing, for wired or wireless clients, access to data resources, applications, and information services that are located at or provided from network 101.

In the overlay enterprise network 100, the access network nodes (e.g., access network node 141-144) can be any device that can directly connect one or more wired host devices (e.g., wired host device 181, wired host device 182) to the overlay enterprise network 100, such as a hub, an Ethernet switch, etc. In some cases, an access network node is known as an access switch, a network switch, or a switching hub. Furthermore, as described in detail herein, access network node 141-144 is configured to ensure packets are delivered between one or more aggregation network nodes, one or more wired host devices, and/or one or more access points that are coupled to the access network nodes. In overlay enterprise network 100, a wired host device can be any device that can receive packets from and/or send packets to an access network node through a wired connection, such as a desktop computer, a workstation, a printer, etc.

In the overlay enterprise network 100, the aggregation network nodes (e.g., aggregation network node 131-132) can be any device that is used to aggregate multiple access network nodes and ensure packets are properly switched or routed within the network, such as a router, a layer-3 switch, etc. Furthermore, as described in detail herein, aggregation network node 131-132 is configured to route packets received from one or more access network nodes to another access network node or a core network node, based on the routing information provided in the packet and the routing policy implemented at aggregation network node 131-132. In some embodiments, a collection of aggregation network nodes and associated access devices (e.g., access network nodes, access points) having a common connection to a redundant set of core network nodes are referred to as a pod. As shown in FIG. 1, aggregation network nodes 131-132 with their associated access network nodes 141-144 and access points 151-152 comprise a pod.

In the overlay enterprise network 100, core network node 121-122, aggregation network node 131-132, and access network node 141-144 are configured collectively to manage and forward wired traffic for one or more wired host devices that are operatively coupled to one or more access network nodes. Wired network nodes including access network nodes 141-144 and aggregation network nodes 131-132 are configured to switch or route packets of a wired session that are received from a wired host device, to another wired network node or a core network node, based on a destination address (e.g., a destination IP address, a destination MAC address) included in the packets. More specifically, some wired traffic that is received at an aggregation network node from an access network node may be switched or routed to another access network node from the aggregation network node if the traffic is destined to a destination device within the same pod. In contrast, the wired traffic destined to a destination device located in another pod is forwarded to a core network node, from which the traffic is forwarded into the other pod. For example, if wired host device 181 sends a packet to access network node 143 destined to wired host device 182, the packet can be first forwarded by access network node 143 to aggregation network node 131. Then, based on the destination IP address or MAC address included in the packet, the packet is further forwarded by aggregation network node 131 to access network node 142, which finally sends the packet to wired host device 182. For another example, if wired host device 181 sends a packet to access network node 143 destined to a device located in network 101, the packet can be first forwarded by access network node 143 to aggregation network node 131. Then, based on the destination IP address or MAC address included in the packet, the packet is further forwarded by aggregation network node 131 to core network node 122, which sends the packet into network 101 for further routing.

In the overlay enterprise network 100, wireless equipment, including WLAN controller 110 and access points 151-152, forward wireless traffic that is received from one or more wireless host devices (e.g., wireless host device 191). Specifically, WLAN controller 110 can be any device that can automatically handle the configuration of multiple access points, and act as a centralized controller configured to manage wireless sessions in an overlay of the wired network portion of the overlay enterprise network 100. An access point can be any device that connects a wireless host device to a wired network (e.g., via an access network node as shown in FIG. 1) using, for example, Wi-Fi, Bluetooth or other wireless communication standards. In some cases, an access point can be located on the same device together with an access network node, such as a wireless Ethernet router equipped with a wireless transceiver. In some other cases, an access point can be a stand-alone device, such as a wireless access point (WAP). Similar to a wired host device, a wireless host device can be any device that can receive packets from and/or send packets to an access point through a wireless connection, such as, for example, a mobile phone, a Wi-Fi enabled laptop, a Bluetooth earphone, etc.

In the overlay enterprise network 100, WLAN controller 110 and access points 151-152 are configured collectively to manage and forward wireless traffic through intervening wired network nodes and core network nodes. Specifically, WLAN controller 110 can be configured to receive encapsulated packets of a wireless session from access point 151 or access point 152 via an Ethernet-over-layer-3 tunnel through intervening wired network nodes and core network nodes, decapsulate the packets, and then bridge the decapsulated packets to core network node 121 or core network node 122, from which the decapsulated packets are further forwarded to the destination. Similarly, WLAN controller 110 is configured to receive packets of the wireless session from core network node 121 or core network node 122 destined to access point 151 or access point 152, encapsulate the packets according to an Ethernet-over-layer-3 tunneling protocol, and then send the encapsulated packets to access point 151 or access point 152 via an Ethernet-over-layer-3 tunnel through intervening wired network nodes and core network nodes, where the encapsulated packets are decapsulated and forwarded to a wireless host device. In some cases, an Ethernet-over-layer-3 tunnel can be a control and provisioning of wireless access points (CAPWAP) tunnel, a generic routing encapsulation (GRE) tunnel, etc.

In the overlay enterprise network 100, one or more broadcast signals requesting control information for one or more host devices can be broadcast to all network entities within the overlay enterprise network 100, including all network nodes (e.g., access points, access network nodes, aggregation network nodes), core network nodes, and WLAN controller 110, such that the control information associated with the broadcast signals can be retrieved and sent to the host device(s) by the relevant recipient. The broadcast signals can be, for example, DHCP requests, ARP requests, ND requests, etc. The broadcast mechanisms for the broadcast signals, however, are operated in different fashions for the wired portion and the wireless portion of the overlay enterprise network 100, as described in detail below.

Typically, a DHCP request can be broadcast from a host device to all network entities within the overlay enterprise network 100, such that control information associated with the DHCP request can be retrieved and sent to the host device. Specifically, after a wired host device is initially directly coupled to an access network node of the overlay enterprise network 100, the wired host device can originate and send a DHCP request to the access network node directly coupled to the wired host device. In response to receiving the DHCP request, the access network node is configured to send the DHCP request to all network devices (e.g., aggregation network nodes) that are directly coupled to the access network node, which again are configured to send the DHCP request to all other network devices that are directly coupled to them. Thus, the DHCP request is broadcast in the overlay enterprise network 100, until it is received by a DHCP server operatively coupled to a network device in the overlay enterprise network 100. As a result, the DHCP server is configured to define control information associated with the DHCP request for the wired host device, and then send the control information to the access network node directly coupled to the wired host device, which is configured to forward the control information to the wired host device. The control information includes at least an IP address for the wired host device, and/or other IP configuration information, such as a lease (length of time when the allocation of the IP address is valid), a subnet mask, a default gateway IP address, etc. Subsequently, the wired host device is configured accordingly based on the received control information.

For example, after wired host device 181 is initially directly coupled to access network node 143, wired host device 181 can originate and send a DHCP request to access network node 143. In response to receiving the DHCP request, access network node 143 is configured to broadcast the DHCP request to all other directly coupled network devices in the overlay enterprise network 100. That is, access network node 143 is configured to send the DHCP request to aggregation network node 131, which is then configured to send the DHCP request to access network node 141, core network node 121, and core network node 122, so on and so forth, until the DHCP request is received by a DHCP server (not shown in FIG. 1) operatively coupled to a network device in the overlay enterprise network 100. As a result, the DHCP server is configured to define control information, including an IP address, for wired host device 181, and then send the control information back to access network node 143, which is configured to forward the control information to wired host device 181. Subsequently, wired host device 181 is configured accordingly based on the received control information.

Similar to a DHCP request, an ARP request can also be broadcast from a wired host device to all network entities within the overlay enterprise network 100, such that control information associated with the ARP request can be retrieved and sent to the host device. In the wired portion of the overlay enterprise network 100, similar to a DHCP request, an ARP request can be originated at and sent from a wired host device to an access network node directly coupled to the wired host device. The ARP request can be a signal requesting control information, such as a MAC address associated with an IP address, for the wired host device. The ARP request can then be broadcast from the access network node to other network entities in the overlay enterprise network 100, and from those network entities to other network entities, until the ARP request is received by a network device that has the control information associated with the ARP request (e.g., a MAC address associated with the IP address), for example, in a cached ARP table stored in the network device. That network device is then configured to send the control information back to the access network node directly coupled to the wired host device, from which the control information is forwarded to and then applied accordingly at the wired host device.

On the other hand, in the wireless portion of the overlay enterprise network 100, similar to a DHCP request, an ARP request can be originated at and sent from a wireless host device to an access point wirelessly coupled to the wireless host device. The access point can then be configured to send the ARP request to WLAN controller 110 via a tunnel (e.g., an Ethernet-over-layer-3 tunnel), from which the ARP request is broadcast to other network entities in the overlay enterprise network 100. When the ARP request is received by a network entity that has the control information associated with the ARP request, that network entity is configured to send the requested control information back to WLAN controller 110, which is then configured to send the control information to the access point via the tunnel. Subsequently, the control information is forwarded from the access point to the wireless host device and then applied accordingly at the wireless host device.

Figure 2:
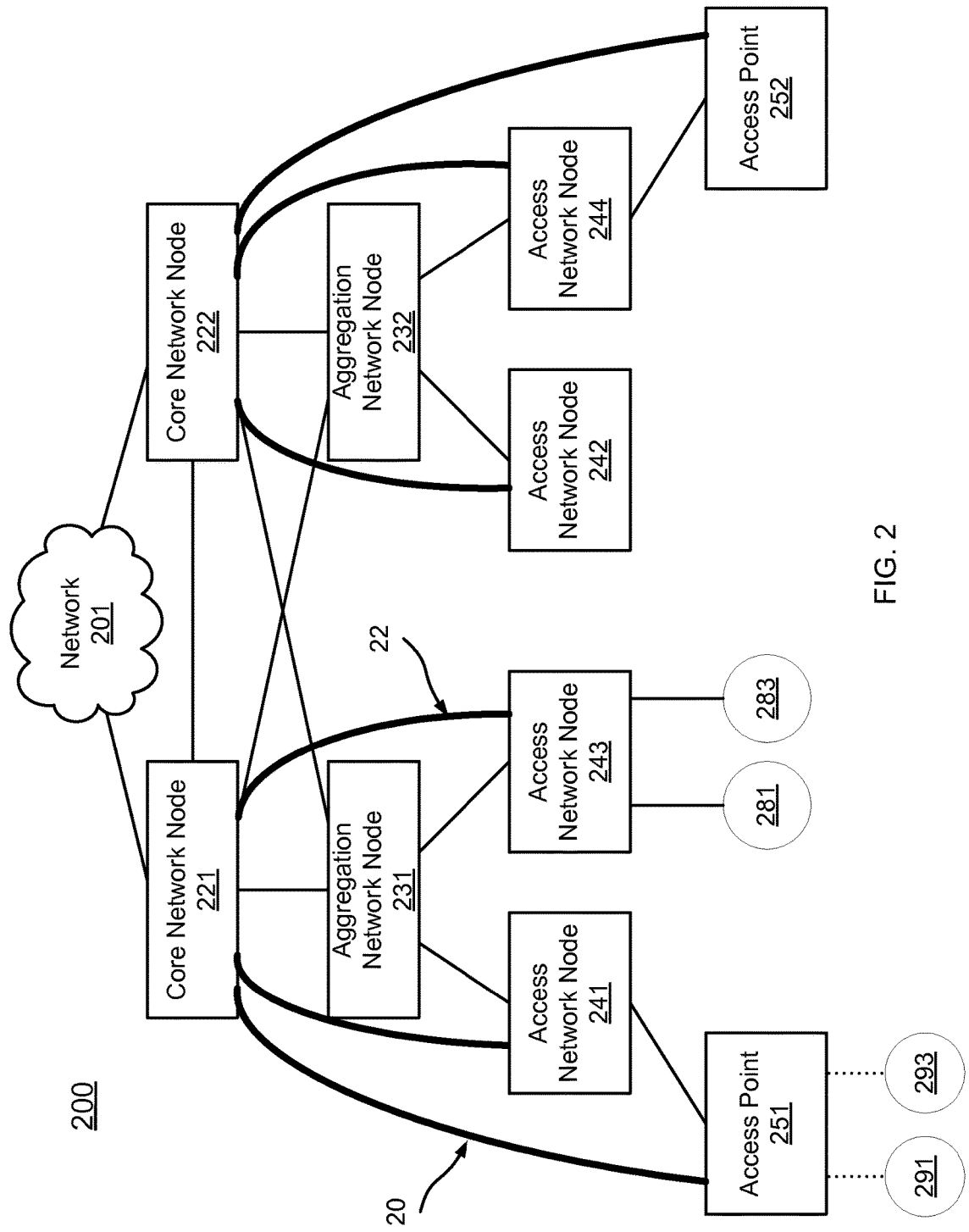
FIG. 2 is a schematic illustration of a homogeneous enterprise network having access points, access network nodes, aggregation network nodes, and core network nodes, according to an embodiment.

FIG. 2 is a schematic illustration of a homogeneous enterprise network 200 having access points (e.g., access point 251, access point 252), access network nodes (e.g., access network node 241-244), aggregation network nodes (e.g., aggregation network node 231, aggregation network node 232), and core network nodes (e.g., core network node 221, core network node 222), according to an embodiment.

Figures 5, 6:
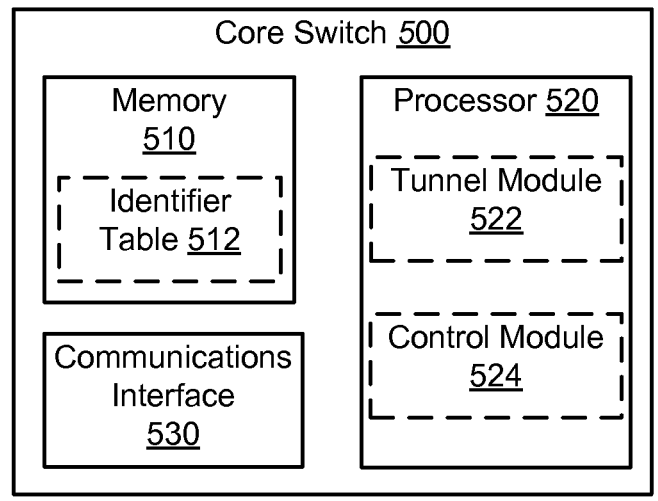
FIG. 5 is a system block diagram of a core network node, according to an embodiment.
FIG. 6 is a schematic illustration of an identifier table implemented in or accessible by a core network node, which associates MAC addresses with IP addresses, according to an embodiment.

A core network node in a homogeneous enterprise network (e.g., core network node 221 or core network node 222 in the homogeneous enterprise network 200) can be, for example, upgraded from a core network node in an overlay enterprise network (e.g., core network node 121 or core network node 122 in overlay enterprise network 100). In such an upgrade, the core network node in a homogeneous enterprise network (e.g., core network node 221, core network node 222) is a single device that combines for example a switch, a router, and a controller, which includes a control module (e.g., control module 524 for core network node 500 as shown in FIG. 5) configured to manage wired/wireless network nodes and/or wired/wireless user sessions. In other words, core network node 221, 222 is a consolidation of at least a WLAN controller (e.g., WLAN controller 110) and a core network node from an overlay enterprise network. On one hand, similar to a core network node from an overlay enterprise network, core network node 221, 222 is still able to forward packets of wired sessions between an aggregation network node and a network that is operatively coupled to core network node 221, 222. On the other hand, unlike a core network node within an overlay enterprise network, core network node 221, 222 can establish a wired session with an access network node, or establish a wireless session with an access point, through intervening wired network nodes, via a tunnel (e.g., the MPLS tunnel, an Ethernet-over-layer-3 tunnel). Detail on tunneling of session data between a core network node and an access network node and/or an access point within a homogeneous enterprise network is described below. In some embodiments, a core network node in a homogeneous enterprise network is referred to as a core SRC (switch, router, and controller).

Similar to core network nodes 221-222, all other devices in the homogeneous enterprise network 200, including aggregation network node 231-232, access network node 241-244, and access point 251-252, can be configured to operate in a homogeneous enterprise network. Specifically, the functionality of access network node 241-244 and aggregation network node 231-232 includes multiplexing client traffic, including packets of wired and wireless sessions, to core network node 221 or core network node 222 without any need for local switching or complex forwarding and classification functionality. For example, unlike aggregation network nodes 131-132 in overlay enterprise network 100, aggregation network node 231 does not need to be configured to switch or route a packet received from access network node 243 to another access network node based on a destination address included in the packet. Instead, aggregation network node 231 can be configured to forward the packet, through a portion of a tunnel between access network node 243 and core network node 221 (shown as the tunnel represented by 22 in FIG. 2), to core network node 221, from which the packet is further switched or routed to the destination. Similarly stated, access network nodes 241-244 are configured to transmit wired traffic to core network node 221 or core network node 222 via a tunnel (e.g., the tunnel represented by 22 in FIG. 2) through intervening aggregation network nodes 231-232. Access points 251-252 are configured to transmit wireless traffic to core network node 221 or core network node 222 via a tunnel (e.g., a tunnel represented by 20 in FIG. 2) through intervening access network nodes and aggregation network nodes.

In such a homogeneous enterprise network, different from the overlay enterprise network 100, the broadcast signals requesting control information (e.g., DHCP requests, ARP requests, ND requests) for one or more host devices typically do not need to be broadcast to all network entities within the homogeneous enterprise network 200, such that the control information associated with the request signals can still be retrieved and sent to the host devices. The non-broadcast mechanisms for the request signals including, for example, DHCP requests, ARP requests or ND requests, are described in detail below. In addition, similar to network 101 shown in FIG. 1, network 201 is a network coupled to the homogeneous enterprise network 200 through core network node 221 and/or core network node 222, which provides access to data resources, applications, and/or information services, to clients that are operatively coupled to the homogeneous enterprise network 200. For example, network 201 can be a data center network, a WAN, the Internet, etc.

In an enterprise network, if every network device included in the enterprise network or a portion of the enterprise network can be controlled by one or more core network nodes, then that enterprise network can be referred to as a homogeneous enterprise network, or that portion of the enterprise network can be referred to as a homogeneous portion of the enterprise network. In such a homogeneous network or portion of the network it is possible to use MPLS tunneling technology to tunnel traffic (e.g., wired or wireless traffic). If not every network node included in a portion of the enterprise network can be controlled by one or more core network nodes, then that portion of the enterprise network is referred to as an overlay enterprise network portion. In some embodiments, one or more network devices included in a homogeneous portion or an overlay enterprise network portion of an enterprise network can tunnel traffic using an Ethernet-over-layer-3 tunneling technology (e.g., CAPWAP, Ethernet-in-GRE). MPLS tunneling technology can be used only in the homogeneous portion.

In a homogeneous enterprise network, a common tunneling technology can be used to forward both the wired traffic and the wireless traffic in any portion of the homogeneous enterprise network. For example, as described in detail herein, the MPLS tunneling technology or an Ethernet-over-layer-3 tunneling technology can be used to forward both the wired traffic and the wireless traffic in any portion of the homogeneous enterprise network 200. In contrast, as described above with respect to FIG. 1, in an overlay enterprise network (e.g., overlay enterprise network 100) an Ethernet-over-layer-3 tunneling technology can be used to forward the wireless traffic in the wireless overlay portion of the overlay enterprise network, while typically no tunneling technology (e.g., an Ethernet-over-layer-3 tunneling technology, the MPLS tunneling technology) is used to forward the wired traffic in the overlay enterprise network.

In an enterprise network, the tunneling technology applied between a core network node and an access device (e.g., an access network node, an access point) depends on the nature and/or capabilities of the core network node, the access device, and the intermediate network device(s) (e.g., aggregation network node) present between the core network node and the access device. Specifically, in an overlay enterprise network (e.g., overlay enterprise network 100), typically no tunneling protocol can be used between a core network node and an access device. In a homogeneous enterprise network (e.g., homogeneous enterprise network 200), a tunneling protocol such as MPLS or an Ethernet-over-layer-3 tunneling protocol can be used.

For example, if wireless communication device 291 sends a packet to access point 251 destined to wired communication device 281, the packet is first encapsulated according to MPLS or an Ethernet-over-layer-3 tunneling protocol (e.g., CAPWAP, Ethernet-in-GRE) at access point 251, and then transmitted to core network node 221 via a MPLS tunnel or an Ethernet-over-layer-3 tunnel through access network node 241 and aggregation network node 231 (shown as the tunnel represented by 20 in FIG. 2). Next, the encapsulated packet is decapsulated according to MPLS or the Ethernet-over-layer-3 tunneling protocol at core network node 221. Then based on a destination IP address or a destination MAC address included in the packet, the packet is encapsulated again according to MPLS or the Ethernet-over-layer-3 tunneling protocol at core network node 221, and the encapsulated packet is forwarded by core network node 221 to access network node 243 via another MPLS tunnel or another Ethernet-over-layer-3 tunnel through aggregation network node 231 (shown as the tunnel represented by 22 in FIG. 2). Finally, the encapsulated packet is decapsulated according to MPLS or the Ethernet-over-layer-3 tunneling protocol at access network node 243, from which the decapsulated packet is delivered to wired communication device 281.

For another example, if wired communication device 281 sends a packet to access network node 243 destined to an IP address located in network 201, the packet is first encapsulated according to MPLS or an Ethernet-over-layer-3 tunneling protocol at access network node 243, and then transmitted to core network node 221 via a MPLS tunnel or an Ethernet-over-layer-3 tunnel through aggregation network node 231 (shown as the tunnel represented by 22 in FIG. 2). Next, the encapsulated packet is decapsulated according to MPLS or the Ethernet-over-layer-3 tunneling protocol at core network node 221. Finally, based on a destination IP address included in the packet, the decapsulated packet is forwarded by core network node 221 to network 201, and further delivered to the destination entity associated with the destination IP address in network 201.

In some embodiments, a centralized core architecture can be implemented in a homogeneous enterprise network. As described in detail herein, core network nodes of the homogeneous enterprise network can provide a single point of configuration and management for all network services as well as a single logic point of interaction for authentication, visibility and monitoring applications. As a result, various types of service modules can be aggregated and/or consolidated at one or more core network nodes, such as firewall, intrusion detection policy (IDP), virtual private network (VPN) termination, and/or load balancing, etc. In such a homogeneous enterprise network, services no longer need to be distributed at various levels in the network, and users can be given consistent policy that is independent of their access mechanism.

Moreover, the core network nodes of the homogenous enterprise network also can provide a single point of session management so that host devices (e.g., wired host devices such as wired host device 281 in FIG. 2, and wireless host devices such as wireless host device 291 in FIG. 2) are authenticated upon entry into the homogenous enterprise network. As discussed herein, tunneled traffic, regardless of its origin, passes through the core network node(s) including for example, tunneled traffic from host devices that is directed through a core network node by the respective access network node (for a wired host device) and access point (for a wireless host device). Because such tunneled traffic passes through the core network nodes, the core network nodes can perform authentication as the host devices enter the homogenous enterprise network. This authentication of host devices allows the core network nodes to establish the location of each of these host devices and its associated MAC address. Thus, no unknown MAC addresses exist within the homogenous enterprise network and no need exists for flooding related to MAC addresses.

In the homogeneous enterprise network 200, unlike in the overlay enterprise network 100, the broadcast signals requesting control information (e.g., DHCP requests, ARP requests, ND requests) for one or more host devices typically do not need to be broadcast to all network entities within the homogeneous enterprise network 200, such that the control information associated with the broadcast signals can still be retrieved and sent to the host devices. Furthermore, the non-broadcast mechanism for broadcast signals is operated in a similar fashion for the wired portion and the wireless portion of the homogeneous enterprise network 200, as described in detail below.

Specifically, a host device (e.g., a wired host device, a wireless host device) can originate and send a broadcast signal to an access device (e.g., an access network node, an access point) coupled (e.g., directly coupled, wirelessly coupled) to the host device. After receiving the broadcast signal, unlike in an overlay enterprise network, the access device is configured to send the broadcast signal to a core network node operatively coupled to the access device via a tunnel (e.g., an Ethernet-over-layer-3 tunnel, a MPLS tunnel). The tunnel can include one or more wired network nodes (e.g., an access network node, an aggregation network node) operatively coupled between the core network node and the access device. In response to receiving the broadcast signal, the core network node is configured to retrieve control information associated with the broadcast signal without broadcasting any other signal. In some embodiments, the associated control information can be retrieved from a data structure stored in a memory within the core network node itself (e.g., an identifier table such as identifier table 512 shown in FIG. 5). In some other embodiments, the associated control information can be retrieved from a server device (e.g., a DHCP server) operatively coupled to the core network node. Thus, the core network node is configured to send the control information back to the access device via the tunnel, from which the control information is further forwarded to and then configured accordingly at the host device.

As an example, a DHCP request does not need to be broadcast from a host device to all network devices within the homogeneous enterprise network 200, such that control information associated with the DHCP request can be retrieved and sent to the host device. Specifically, after a host device (e.g., a wired host device, a wireless host device) is initially coupled (e.g., directly coupled, wirelessly coupled) to an access device (e.g., an access network node, an access point) of the homogeneous enterprise network 200, the host device can originate and send a DHCP request to the access device coupled to the host device. After receiving the DHCP request, the access device is configured to send the DHCP request to a core network node operatively coupled to the access device via a tunnel (e.g., an Ethernet-over-layer-3 tunnel, a MPLS tunnel) through one or more intervening wired network nodes (e.g., an access network node, an aggregation network node). In response to receiving the DHCP request via the tunnel, the core network node is configured to send a unicast signal to a DHCP server (not shown in FIG. 2) coupled to the core network node, such that control information associated with the DHCP request including an IP address assigned to the host device is retrieved from the DHCP server to the core network node. In some embodiments, the DHCP server is directly coupled to the core network node. In some other embodiments, the DHCP server is operatively coupled to the core network node, and the core network node can be configured to communicate with the DHCP server to retrieve the control information without broadcasting any signal. Next, the core network node is configured to send the control information to the access device via the tunnel, from which the control information is forwarded to and then applied accordingly at the host device.

For example, after wired host device 281 is initially directly coupled to access network node 243, wired host device 281 can originate and send a DHCP request to access network node 243. Access network node 243 is then configured to send the DHCP request to core network node 221 via a MPLS tunnel (shown as the tunnel represented by 22 in FIG. 2) through aggregation network node 231. In response to receiving the DHCP request, core network node 221 is configured to send a unicast signal to a DHCP server (not shown in FIG. 2) operatively coupled to core network node 221 and located in network 201, such that control information associated with wired host device 281 including an IP address, a subnet address, a gateway address, and/or other IP configuration information is retrieved from the DHCP server. Core network node 221 is then configured to send the control information to access network node 243 via the MPLS tunnel, from which the control information is forwarded to and then applied accordingly at wired host device 281.

For another example, after wireless host device 291 is initially wirelessly coupled to access point 251, wireless host device 291 can originate and send a DHCP request to access point 251. Access point 251 is then configured to send the DHCP request to core network node 221 via an Ethernet-over-layer-3 tunnel (shown as the tunnel represented by 20 in FIG. 2) through access network node 241 and aggregation network node 231. In response to receiving the DHCP request, core network node 221 is configured to send a unicast signal to a DHCP server (not shown in FIG. 2) directly coupled to core network node 221, such that control information associated with wireless host device 291 including an IP address, a subnet address, a gateway address, and/or other IP configuration information is retrieved from the DHCP server. Core network node 221 is then configured to send the control information to access point 251 via the Ethernet-over-layer-3 tunnel, from which the control information is forwarded to and then applied accordingly at wireless host device 291.

Similarly, an ARP request originated at a host device, which typically requests a MAC address associated with an IP address, does not need to be broadcast to all network entities within the homogeneous enterprise network 200, such that control information associated with the ARP request can be retrieved and sent to the host device. As described above, core network nodes 221 and/or 222 in the homogeneous enterprise network 200 can be configured to retrieve control information associated with DHCP requests. Thus, core network nodes 221 and/or 222 can be configured to learn the IP addresses and MAC addresses of at least a portion of the associated host devices, routers and/or gateways (e.g., other core network nodes) in the homogeneous enterprise network 200 via DHCP snooping or other IP packet snooping. That is, when core network node 221 and/or core network node 222 retrieves, from a DHCP server, control information associated with a DHCP request originated at a host device, core network node 221 and/or 222 can be configured to learn the IP address and the MAC address of the host device by snooping the retrieved control information. Core network node 221 and/or 222 can be further configured to associate the IP address with the MAC address, and then store the associated IP address and MAC address into an identifier table (e.g., a cached ARP table) in core network node 221 and/or 222, such as identifier table 512 of core network node 500 shown and described with respect to FIG. 5. Thus, core network node 221 and/or 222 can function as a proxy ARP on behalf of the host devices, routers and/or gateways that are operatively coupled to the core network node.

Specifically, a host device (e.g., a wired host device, a wireless host device) can originate and send an ARP request to an access device (e.g., an access network node, an access point) coupled (e.g., directly coupled, wirelessly coupled) to the host device. After receiving the ARP request, the access device is configured to send the ARP request to a core network node operatively coupled to the access device via a tunnel (e.g., an Ethernet-over-layer-3 tunnel, a MPLS tunnel) through one or more intervening wired network nodes (e.g., an access network node, an aggregation network node). In response to receiving the ARP request via the tunnel, the core network node is configured to retrieve control information associated with the ARP request (e.g., a MAC address associated with the IP address included in the ARP request) from an identifier table stored in the core network node without broadcasting any signal. The core network node is then configured to send the control information to the access device via the tunnel, from which the control information is forwarded to and then applied accordingly at the host device.

For example, in connection with sending data packets to wireless host device 291, wired host device 281 can originate and send an ARP request to access network node 243, requesting a MAC address associated with an IP address of wireless host device 291. After receiving the ARP request, access network node 243 is configured to send the ARP request to core network node 221 via an Ethernet-over-layer-3 tunnel (shown as the tunnel represented by 22 in FIG. 2) through aggregation network node 231. In response to receiving the ARP request via the Ethernet-over-layer-3 tunnel, core network node 221 is configured to retrieve control information associated with the ARP request, including a MAC address associated with the IP address of wireless host device 291, from an identifier table stored in core network node 221. Core network node 221 is then configured to send the control information to access network node 243 via the Ethernet-over-layer-3 tunnel, from which the control information is forwarded to and then applied accordingly at wired host device 281. Thus, wired host device 281 obtains the MAC address of wireless host device 291, and therefore, can send data packets to wireless host device 291.

For another example, in connection with sending data packets to a device in network 201, wireless host device 291 can originate and send an ARP request to access point 251, requesting a MAC address associated with an IP address of the device in network 201. After receiving the ARP request, access point 251 is configured to send the ARP request to core network node 221 via a MPLS tunnel (shown as the tunnel represented by 20 in FIG. 2) through access network node 241 and aggregation network node 231. In response to receiving the ARP request via the MPLS tunnel, core network node 221 is configured to determine that the IP address of the device is associated with network 201. Because core network node 221 is configured to function as a router (or gateway) that connects the remaining portions of the homogeneous enterprise network 200 with network 201, core network node 221 is configured to respond with its own MAC address to wireless host device 291 as the MAC address associated with the IP address of the device in network 201. In other words, core network node 221 is configured to send control information associated with the ARP request, which includes the MAC address of core network node 221, to access point 251 via the MPLS tunnel. As described with respect to FIG. 6, in some embodiments, the MAC address of core network node 221 is associated with one or more IP addresses or a range of IP addresses in network 201 in an identifier table (e.g., identifier tables 512 and 600 shown in FIGS. 5 and 6, respectively) in core network node 221. Subsequently, access point 251 is configured to forward the control information to wireless host device 291, at which the control information is applied accordingly. As a result, wireless host device 291 sends all data packets destined to the device in network 201 to core network node 221, which then forwards the data packets into network 201.

In some embodiments, core network node 221 and/or 222 in the homogeneous enterprise network 200 can be configured to send a multicast request to a set of network entities in the homogeneous enterprise network 200 such that control information associated with a broadcast signal received at core network node 221 and/or 222 can be retrieved from at least one network entity from the set of network entities. Particularly, in response to receiving an ARP request, core network node 221 and/or 222 can be configured to send a multicast request to a set of network entities in the homogeneous enterprise network 200 whose IP addresses are not associated with any MAC address in an identifier table at core network node 221 and/or 222, such that control information including the MAC address of one of the network entities may be retrieved and sent to core network node 221 and/or 222.

Specifically, after receiving an ARP request from an access device via a tunnel (e.g., an Ethernet-over-layer-3 tunnel, a MPLS tunnel), a core network node is configured to determine, in an identifier table, a MAC address associated with the IP address included in the ARP request. If such a MAC address is not located in the identifier table, the core network node can be configured to send a multicast request to a set of network entities (e.g., host devices, routers, gateways, etc.) in the homogeneous enterprise network 200 whose IP addresses are not associated with any MAC address in the identifier table. The multicast request queries each of the network entities, such that one network entity having the IP address included in the ARP request can be identified. As a result, control information including the MAC address of an identified network entity may be retrieved and sent to the core network node. Thus, the core network node is configured to send the control information, including the MAC address associated with the IP address included in the ARP request, to the access network node via the tunnel.

Similar to a DHCP request and an ARP request, an Nd request originated at a host device does not need to be broadcast to all network entities within the homogeneous enterprise network 200, such that control information associated with the ND request can be retrieved and sent to the host device. Core network nodes 221 and/or 222 in the homogeneous enterprise network 200 can be configured to retrieve control information associated with an ND request in response to the ND request. Thus, core network nodes 221 and/or 222 can be configured to send a signal to a database and receive (or retrieve) from the database control information such as an association between the MAC address of the host device and the IP address of the host device, or information about the IP addresses assigned to other network nodes or host devices. This control information can then be provided from the core network nodes 221 and/or 222 to the request host device.

While in some embodiments every data packet within the data plane is sent through a core network node 221 or 222, in other embodiments each access point (e.g., access point 251, access point 252) and/or access network node (e.g., access network node 241-244) does not tunnel to the core network node packets that are addressed to a host device wirelessly or directly coupled to that access point or that access network node, respectively. Similarly stated, each access point and/or access network node does not tunnel packets that are received from host devices operatively coupled to that access point and/or access network node without any intervening switch. A host device is operatively coupled to an access point and/or access network node without any intervening switch if a network node configured to switch and/or route a data packet is not disposed within the data path between the host device and the access point and/or access network node. Thus, for example, a host device that receives a wireless signal transmitted from a wireless access point can be said to be operatively coupled to the wireless access point without any intervening switch. For another example, a host device coupled to a wired access network node via only an Ethernet cable can be said to be operatively coupled to the wired access network node without any intervening switch.

In some embodiments, a memory of each access point and/or access network node can store an identifier (e.g., MAC address, IP address, and/or the like) associated with each host device operatively coupled to that access point or access network node without any intervening switch, respectively. For example, if wireless host device 291 sends a packet to access point 251 destined for host device 293, the access point 251 can send the packet directly to wireless host device 293 without sending the packet to core network node 221 via tunnel 20. For another example, if wired host device 281 sends a packet to access network node 243 destined for host device 283, the access network node 243 can send the packet directly to wired host device 283 without sending the packet to core network node 221 via tunnel 22. This reduces or minimizes the use of the tunnels between the access points and the core network nodes.

Figure 3:
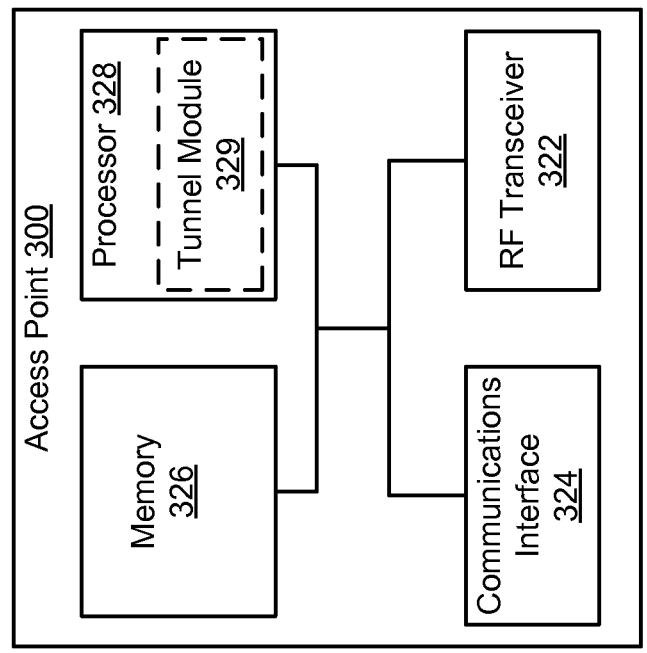
FIG. 3 is a system block diagram of an access point, according to an embodiment.

FIG. 3 is a system block diagram of an access point 300, according to an embodiment. Similar to access point 251 and access point 252 in the homogeneous enterprise network 200 shown in FIG. 2, access point 300 can be any device that connects one or more wireless host devices to a homogeneous enterprise network (e.g., via an access network node) using for example, Wi-Fi, Bluetooth or other wireless communication standards. For example, access point 300 can be a wireless access point (WAP). As shown in FIG. 3, access point 300 includes RF transceiver 322, communications interface 324, memory 326, and processor 328, which contains tunnel module 329. Each component of access point 300 is operatively coupled to each of the remaining components of access point 300. Furthermore, each operation of RF transceiver 322 (e.g., transmit/receive data), communications interface 324 (e.g., transmit/receive data), tunnel module 329 (e.g., encapsulate/decapsulate packets), as well as each manipulation on memory 326 (e.g., update a policy table), are controlled by processor 328.

In some embodiments, access point 300 can communicate with a wireless host device (e.g., a Wi-Fi enabled laptop, a mobile phone) using any suitable wireless communication standard such as, for example, Wi-Fi, Bluetooth, and/or the like. Specifically, access point 300 can be configured to receive data and/or send data through RF transceiver 322, when communicating with a wireless host device. Furthermore, in some embodiments, an access point of an enterprise network uses one wireless communication standard to wirelessly communicate with a wireless host device operatively coupled to the access point; while another access point of the enterprise network uses a different wireless communication standard to wirelessly communicate with a wireless host device operatively coupled to the other access point. For example, as shown in FIG. 2, access point 251 can receive data packets through its RF transceiver from wireless host device 291 (e.g., a Wi-Fi enabled laptop) based on the Wi-Fi standard; while access point 252 can send data packets from its RF transceiver to another wireless host device (e.g., a Bluetooth-enabled mobile phone) (not shown in FIG. 2) based on the Bluetooth standard.

In some embodiments, access point 300 can be operatively coupled to an access network node by implementing a wired connection between communications interface 324 and the counterpart (e.g., a communications interface) of the access network node. The wired connection can be, for example, twisted-pair electrical signaling via electrical cables, fiber-optic signaling via fiber-optic cables, and/or the like. As such, access point 300 can be configured to receive data and/or send data through communications interface 324, which is connected with the communications interface of an access network node, when access point 300 is communicating with the access network node. Furthermore, in some embodiments, an access point of an enterprise network implements a wired connection with an access network node operatively coupled to the access point; while another access point of the enterprise network implements a different wired connection with an access network node operatively coupled to the other access point. For example, as shown in FIG. 2, access point 251 can implement one wired connection such as twisted-pair electrical signaling to connect with access network node 241; while access point 252 can implement a different wired connection such as fiber-optic signaling to connect with access network node 244.

In some embodiments, as described with respect to FIG. 2, access point 300 can be configured to prepare a packet (e.g., a data packet, a control packet) received from a wireless communication device operatively coupled to access point 300, and send the packet to another network device such as a core network node via a tunnel (e.g., an Ethernet-over-layer-3 tunnel, a MPLS tunnel). Access point 300 can also be configured to decapsulate a packet received via a tunnel from another network device such as a core network node, before forwarding the decapsulated packet to a wireless host device operatively coupled to access point 300. Specifically, upon receiving a packet from a wireless host device operatively coupled to access point 300, tunnel module 329 is configured to encapsulate the packet (e.g., add a header portion, a footer portion, and/or modify any other identifiers included within the packet) according to a predetermined tunneling protocol (e.g., CAPWAP, Ethernet-in-GRE, MPLS). The encapsulated packet is then sent through communications interface 324 to an access network node connected to access point 300, from which the encapsulated packet is forwarded along the tunnel to a network device at the end of the tunnel. On the other hand, upon receiving a packet from an access network node connected to access point 300 that is sent through a tunnel from a network device, tunnel module 329 is configured to decapsulate the packet (e.g., remove a header portion, a footer portion, and/or modify any other identifiers included within the packet) according to a predetermined tunneling protocol (e.g., CAPWAP, Ethernet-in-GRE, MPLS). The decapsulated packet is then sent by RF transceiver 322 to a wireless host device operatively coupled to access point 300.

In some embodiments, as described with respect to FIG. 2, when the network device (e.g., a core network node) at the end of the tunnel and all the intervening wired network nodes (e.g., access network nodes, aggregation network nodes) are within a homogeneous enterprise network or a homogeneous portion of a heterogeneous enterprise network, tunnel module 329 can be configured to encapsulate or decapsulate a packet according to a tunneling protocol such as MPLS or an Ethernet-over-layer-3 tunneling protocol. In such embodiments, access point 300 can be configured to send a packet to and/or receive a packet from a core network node via a tunnel such as a MPLS tunnel or an Ethernet-over-layer-3 tunnel through intervening wired network nodes. In some other embodiments, as described below with respect to FIG. 1, when one or more of the network devices at the end of the tunnel and intervening wired network nodes are within an overlay enterprise network portion, tunnel module 329 may be configured to encapsulate or decapsulate a packet, for example, according to an Ethernet-over-layer-3 tunneling protocol (e.g., CAPWAP, Ethernet-in-GRE). In such embodiments, access point 300 may be configured to send a packet to and/or receive a packet from a core network node via an Ethernet-over-layer-3 tunnel through the intervening wired network nodes.

In some embodiments, data other than up-link policies that is related to operations of access point 300 can also be stored in memory 326. For example, MAC addresses of potential user communication devices can be stored in memory 326, such that a user communication device can be recognized by access point 300 upon being operatively coupled to access point 300. For another example, information associated with tunneling packets to a core network node can be stored in memory 326, such that establishing a tunnel such as a MPLS tunnel or a layer-3 tunnel with the core network node can be initialized by access point 300.

In some embodiments, memory 326 can be, for example, a random-access memory (RAM) (e.g., a dynamic RAM, a static RAM), a flash memory, a removable memory, and/or so forth. In some embodiments, data related to operations of access point 300 can be stored in memory 326. For example, an up-link policy table (not shown in FIG. 3) can be stored in memory 326, such that one or more up-link policies associated with a user can be downloaded to and enforced at access point 300 when the user is operatively coupled to access point 300 using a wireless host device. For another example, information associated with tunneling packets to a core network node can be stored in memory 326, such that establishing a tunnel such as a MPLS tunnel or an Ethernet-over-layer-3 tunnel with the core network node can be initialized by access point 300.

Similar to access points 251, 252 in the homogeneous enterprise network 200 described above with respect to FIG. 2, access point 300 does not broadcast a broadcast signal (e.g., a DHCP request, an ARP request, ND request)

received at RF transceiver 322 from a wireless host device wirelessly coupled to access point 300. Instead, access point 300 is configured to send the broadcast signal to a core network node operatively coupled to access point 300 via a tunnel (e.g., an Ethernet-over-layer-3 tunnel, a MPLS tunnel). Specifically, tunnel module 329 is configured to encapsulate the broadcast signal according to a predetermined tunneling protocol (e.g., CAPWAP, GRE, MPLS). The encapsulated broadcast signal is then sent through communications interface 324 to the core network node via a predetermined tunnel. Similarly, access point 300 is configured to receive encapsulated control information associated with the broadcast signal from the core network node via the tunnel, decapsulate the received packets to retrieve the control information, and then send the control information to the wireless host device wirelessly coupled to access point 300.

Figure 4:
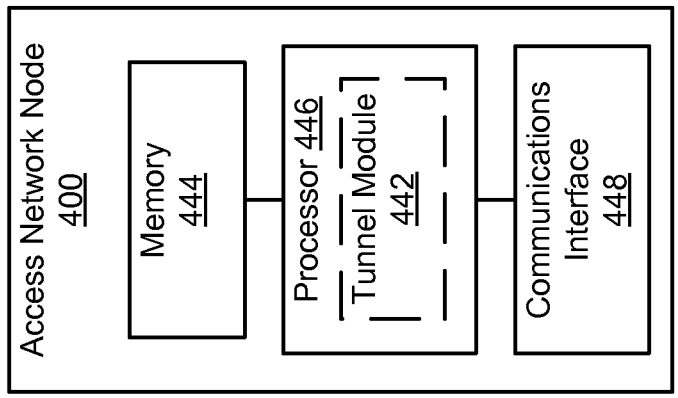
FIG. 4 is a system block diagram of an access network node, according to an embodiment.

FIG. 4 is a system block diagram of an access network node 400, according to an embodiment. Similar to access network node 241-244 in the homogeneous enterprise network 200 shown in FIG. 2, access network node 400 can be any device that connects one or more wired host devices to a homogeneous enterprise network, such as a hub, an Ethernet switch, etc. More specifically, access network node 400 is configured to ensure packets are transmitted between one or more aggregation network nodes, wired host devices, and/or access points that are operatively coupled to access network node 400. As shown in FIG. 4, access network node 400 includes communications interface 448, memory 444, and processor 446, which contains tunnel module 442. Each component of access network node 400 is operatively coupled to each of the remaining components of access network node 400. Furthermore, each operation of communications interface 448 (e.g., transmit/receive data), tunnel module 442 (e.g., encapsulate/decapsulate packets), as well as each manipulation on memory 444 (e.g., update a policy table), are controlled by processor 446.

In some embodiments, communications interface 448 of access network node 400 includes at least two ports (not shown in FIG. 4) that can be used to implement one or more wired connections between access network node 400 and one or more access points, wired host devices, and/or aggregation network nodes. The wired connection can be, for example, twisted-pair electrical signaling via electrical cables, fiber-optic signaling via fiber-optic cables, and/or the like. As such, access network node 400 can be configured to receive data and/or send data through one or more ports of communications interface 448, which are connected to the communications interfaces of one or more access points, wired host devices, and/or aggregation network nodes. Furthermore, in some embodiments, access network node 400 can implement a wired connection with one of an access point, a wired host device, or an aggregation network node that is operatively coupled to access network node 400 through one port of communications interface 448, while implementing a different wired connection with another access point, wired host device, or aggregation network node that is operatively coupled to access network node 400 through another port of communications interface 448. For example, as shown in FIG. 2, access network node 241 can implement one wired connection such as twisted-pair electrical signaling to connect with access point 251, while implementing a different wired connection such as fiber-optic signaling to connect with aggregation network node 231.

In some embodiments, as described with respect to FIG. 2 and FIG. 3, access network node 400 can be one of the intervening wired network nodes between an access point and a core network node, through which a tunnel (e.g., an Ethernet-over-layer-3 tunnel, a MPLS tunnel) is established between the access point and the core network node. In such embodiments, access network node 400 can be configured to forward a tunneled packet (e.g., a packet encapsulated according to an Ethernet-over-layer-3 tunneling protocol, a packet encapsulated according to MPLS). For example, as shown in FIG. 2, access network node 241 can forward a tunneled packet encapsulated according to MPLS or an Ethernet-over-layer-3 tunneling protocol, which is received from access point 251, to aggregation network node 231 along a MPLS tunnel or an Ethernet-over-layer-3 tunnel (shown as the tunnel represented by 20 in FIG. 2) between access point 251 and core network node 221.

In some embodiments, as described with respect to FIG. 2, access network node 400 can be configured to prepare a packet (e.g., a data packet, a control packet) received from a wired host device operatively coupled to access network node 400, and send the packet to another network device such as a core network node via a tunnel (e.g., a tunnel according to an Ethernet-over-layer-3 tunneling protocol (e.g., Ethernet-in-GRE, CAPWAP, etc.) or the MPLS protocol). Access network node 400 can also be configured to decapsulate a packet received via a tunnel from another network device such as a core network node, before forwarding the decapsulated packet to a wired host device operatively coupled to access network node 400. Specifically, upon receiving a packet from a wired host device operatively coupled to access network node 400, tunnel module 442 is configured to encapsulate the packet (e.g., add a header portion, a footer portion, and/or modify any other identifiers included within the packet) according to the protocol of the tunnel. The encapsulated packet is then sent through a port of communications interface 448 to an aggregation network node connected to access network node 400, from which the encapsulated packet is forwarded along the tunnel to a core network node. On the other hand, upon receiving a packet from an aggregation network node connected to access network node 400 that is sent through a tunnel from a core network node, tunnel module 442 is configured to decapsulate the packet (e.g., remove a header portion, a footer portion, and/or modify any other identifiers included within the packet) according to the protocol of the tunnel. The decapsulated packet is then sent through a port of communications interface 448 to a wired host device operatively coupled to access network node 400.

In some embodiments, memory 444 can be, for example, a random-access memory (RAM) (e.g., a dynamic RAM, a static RAM), a flash memory, a removable memory, and/or so forth. In some embodiments, data other than up-link policies that is related to operations of access network node 400 can also be stored in memory 444. For example, MAC addresses of potential user host devices can be stored in memory 444, such that a user host device can be recognized by access network node 400 upon being operatively coupled to access network node 400. For another example, information associated with tunneling packets to a core network node can be stored in memory 444, such that establishing a MPLS tunnel or an Ethernet-over-layer-3 tunnel with the core network node can be initialized by access network node 400.

Similar to access network nodes 241-244 in the homogeneous enterprise network 200 described above with respect to FIG. 2, access network node 400 does not broadcast a broadcast signal (e.g., a DHCP request, an ARP request, ND request) received at a port of communications interface 448 from a wired host device directly coupled to access network node 400. Instead, access network node 400 is configured to send the broadcast signal to a core network node operatively coupled to access network node 400 via a tunnel (e.g., an Ethernet-over-layer-3 tunnel, a MPLS tunnel). Specifically, tunnel module 442 is configured to encapsulate the broadcast signal according to a predetermined tunneling protocol (e.g., CAPWAP, GRE, MPLS). The encapsulated broadcast signal is then sent through a port of communications interface 448 to the core network node via a predetermined tunnel. Similarly, access network node 400 is configured to receive encapsulated control information associated with the broadcast signal from the core network node via the tunnel, decapsulate the received packets to retrieve the control information, and then send the control information to the wired host device directly coupled to access network node 400.

FIG. 5 is a system block diagram of a core network node 500, according to an embodiment. Similar to core network node 221 and core network node 222 in the homogeneous enterprise network 200 shown in FIG. 2, core network node 500 can be any switching device positioned in the physical core, or backbone, of an enterprise network, which is configured to operatively couple the remaining devices (e.g., aggregation network nodes, access network nodes, access points) of the enterprise network to one or more other networks that provide access to data resources and/or information services. More specifically, core network node 500 is configured, for example, to forward data between one or more aggregation network nodes and one or more other networks that are operatively coupled to core network node 500, based on IP routing services. Furthermore, core network node 500 is configured, for example, to manage both wired and wireless network devices, manage user sessions for both wired and wireless clients, and retrieve control information associated with broadcast signals received from wired and wireless host devices, as described in detail herein.

As shown in FIG. 5, core network node 500 includes communications interface 530; memory 510, which contains identifier table 512; and processor 520, which contains tunnel module 522 and control module 524. Each operation of communications interface 530 (e.g., transmit/receive data), tunnel module 522 (e.g., encapsulate/decapsulate packets), and control module 524 (e.g., manage a user session), as well as each manipulation on identifier table 512 (e.g., modify an entry) or any other portion of memory 510, are controlled by processor 520.

In some embodiments, communications interface 530 of core network node 500 includes at least two ports (not shown in FIG. 5) that can be used to implement one or more wired connections between core network node 500 and one or more aggregation network nodes, one or more access network nodes, other core network nodes, and/or devices of other networks. The wired connections can be, for example, twisted-pair electrical signaling via electrical cables, fiber-optic signaling via fiber-optic cables, and/or the like. As such, core network node 500 can be configured to receive data and/or send data through one or more ports of communications interface 530, which are connected with the communications interfaces of one or more aggregation network nodes, one or more access network nodes, other core network nodes, and/or devices of other networks. Furthermore, in some embodiments, core network node 500 can implement a wired connection with one of an aggregation network node, an access network node, another core network node, or a device of another network that is operatively coupled to core network node 500 through one port of communications interface 530, while implementing a different wired connection with another aggregation network node, access network node, core network node, or device of another network that is operatively coupled to core network node 500 through another port of communications interface 530. For example, as shown in FIG. 2, core network node 221 can implement one wired connection such as twisted-pair electrical signaling to connect with aggregation network node 231, aggregation 232 and core network node 222, while implementing a different wired connection such as fiber-optic signaling to connect with a device of network 201.

In some embodiments, as described with respect to FIG. 2, core network node 500 can be configured to prepare a packet (e.g., a data packet, a control packet) to be sent to an access device (e.g., an access point, an access network node) via a tunnel (e.g., a tunnel according to an Ethernet-over-layer-3 tunneling protocol (e.g., Ethernet-in-GRE, CAPWAP, etc.) or the MPLS protocol). Core network node 500 can also be configured to receive and decapsulate an encapsulated packet from an access device via a tunnel. Similar to core network nodes in overlay enterprise network 100 shown in FIG. 1, core network node 500 can be configured to forward packets to and/or receive packets from other network devices that are operatively coupled to core network node 500, including other core network nodes and/or devices in other networks, without using any tunneling technology. Particularly, control module 524 of core network node 500 is configured to manage both wired and wireless user sessions for one or more users and/or for one or more wired and/or wireless host devices.

More specifically, upon receiving a packet associated with a user session at a port of communications interface 530 via an Ethernet-over-layer-3 tunnel or a MPLS tunnel, tunnel module 522 is configured to decapsulate the packet (e.g., remove a header portion, a footer portion, and/or modify any other identifiers included within the packet) according to the protocol for that tunnel. Alternatively, core network node 500 receives a packet associated with a user session at a port of communications interface 530 from another network device operatively coupled to core network node 500, such as another core network node or a device in another network. To forward the received packet, control module 524 is configured to check the destination IP address included in the packet. If the packet is not destined to a user in a pod that is directly connected to core network node 500 (e.g., destined to a network device in a pod that is not connected to core network node 500, destined to a user in another network), control module 524 is configured to forward the packet, from a port of communications interface 530, to a network device that is operatively coupled to core network node 500, such as another core network node or a device in another network, without using any tunneling technology. If the packet is destined to a user in a pod that is directly connected to core network node 500, tunnel module 522 is configured to encapsulate the packet (e.g., add a header portion, a footer portion, and/or modify any other identifiers included within the packet) according to an Ethernet-over-layer-3 tunneling protocol or the MPLS protocol. Meanwhile, control module 524 is configured to establish an Ethernet-over-layer-3 tunnel or a MPLS tunnel connecting core network node 500 to the access device (e.g., an access network node, an access point) that is operatively coupled to the host device (if such an Ethernet-over-layer-3 tunnel or MPLS tunnel is not established yet). Finally, control module 524 is configured to send the encapsulated packet, from a port of communications interface 530, to the access device through the Ethernet-over-layer-3 tunnel or the MPLS tunnel.

As described with respect to FIG. 2 and shown in FIG. 5, control information associated with one or more types of broadcast signals, including ARP requests, can be stored in identifier table 512, which is located and maintained within a portion of memory 510 in core network node 500. For example, as shown and described with respect to FIG. 6, one or more IP addresses and one or more MAC addresses of network entities (e.g., host devices, access points, access network nodes, aggregation network nodes, etc.) in a homogeneous enterprise network can be stored in identifier table 512. As described herein, in response to receiving an ARP request from a host device, processor 520 of core network node 500 can be configured to retrieve from identifier table 512 control information including a MAC address associated with an IP address included in the ARP request, and then send the control information including the MAC address to the host device from a port of communications interface 530.

Similar to core network nodes 221 and 222 in the homogeneous enterprise network 200 described with respect to FIG. 2, core network node 500 does not broadcast a broadcast signal (e.g., a DHCP request, an ARP request, ND request) received at a port of communications interface 530 via a tunnel (e.g., an Ethernet-over-layer-3 tunnel, a MPLS tunnel) from an access device (e.g., an access network node, an access point) coupled to a host device (e.g., a wired host device, a wireless host device). Instead, core network node 500 is configured to retrieve control information associated with the broadcast signal, and then send the control information to the access device via the tunnel, from which the control information is forwarded to and then applied at the host device.

Specifically, after receiving a broadcast signal via a tunnel from an access device coupled to a host device, tunnel module 522 is configured to decapsulate the received packets according to an associated tunneling protocol to retrieve the broadcast signal. Based on the retrieved broadcast signal, processor 520 is configured to retrieve control information associated with the broadcast signal. For example, if a DHCP request originated at a host device is received, processor 520 can be configured to send a unicast signal to a DHCP server operatively coupled to core network node 500, such that control information including an IP address assigned to the host device can be retrieved from the DHCP server. For another example, if an ARP request including an IP address is received, processor 520 can be configured to retrieve control information including a MAC address associated with the IP address from identifier table 512. Next, tunnel module 522 is configured to encapsulate the retrieved control information according to the tunneling protocol, and processor 520 is configured to send the encapsulated control information to the access device from a port of communications interface 530 via the tunnel. Subsequently, the control information is forwarded from the access device to the host device, and applied accordingly at the host device.

In some embodiments, memory 510 can be, for example, a random-access memory (RAM) (e.g., a dynamic RAM, a static RAM), a flash memory, a removable memory, and/or so forth. In some embodiments, data other than the control information associated with broadcast signals that is related to operations of core network node 500 can also be stored in memory 510. For example, combinations of user IDs and passwords of potential users can be stored in memory 510, such that the identification of a user can be verified by core network node 500 upon a user ID and a password entered by the user being provided to core network node 500. Alternatively, the memory 510 can store address information for an external server that stores user authentication information (e.g., user IDs and passwords) and related policy. For another example, information associated with tunneling packets to one or more access devices can be stored in memory 510, such that establishing a MPLS tunnel or an Ethernet-over-layer-3 tunnel with one of the access devices can be initialized by core network node 500.

FIG. 6 is a schematic illustration of an identifier table 600 implemented in or accessible by a core network node (e.g., identifier table 512 implemented in core network node 500 as shown in FIG. 5), which associates MAC addresses with IP addresses, according to an embodiment. Identifier table 600 has two columns, shown as IP address 620 and MAC address 640. Each entry (i.e., row) of identifier table 600 defines an association of an IP address and a MAC address (may be unknown) of a network entity (e.g., a host device, a router, a gateway, etc.) in a homogeneous enterprise network (e.g., the homogeneous enterprise network 200 in FIG. 2). Each entry of identifier table 600 can include one entry of an IP address in IP address 620 and/or one entry of a MAC address in MAC address 640. In some embodiments, identifier table 600 can be, for example, a cached ARP table stored in a core network node.

Specifically, the first column, IP address 620, contains IP addresses (e.g., 192.168.10.1, 192.168.20.x, 192.168.10.100), each of which uniquely identifies an IP address of a device or a range of IP addresses of a group of devices, which are within or associated with the homogeneous enterprise network. The second column, MAC address 640, contains MAC addresses (e.g., 01:23:45:67:89: ab, 11:22:33:44:55:66), each of which identifies a unique MAC address of a network entity in the homogeneous enterprise network. As described herein with respect to FIG. 2 and FIG. 5, in response to receiving an ARP request that requests a MAC address associated with an IP address, a core network node that accesses or hosts identifier table 600 can be configured to retrieve the MAC address associated with the IP address from identifier table 600. Each MAC address stored in an entry (i.e., row) of identifier table 600 is associated with an IP address or a range of IP addresses in the same entry of identifier table 600. Furthermore, a data packet destined to an IP address of a network entity can be delivered to the network entity by using a MAC address associated with the IP address in identifier table 600 as the destination MAC address in a header of the data packet.

For example, as shown in FIG. 2, identifier table 600 can be an identifier table implemented in or accessible by core network node 221, and the first entry stored in identifier table 600 can be associated with wired host device 281. Said in another way, wired host device 281 has an IP address of 192.168.10.1 and a MAC address of 01:23:45:67:89:ab. When core network node 221 receives an ARP request requesting a MAC address associated with the IP address 192.168.10.1, core network node 221 is configured to determine from identifier table 600 that the MAC address 01:23: 45:67:89:ab is associated with the IP address 192.168.10.1. Thus, core network node 221 is configured to send control information including the MAC address 01:23:45:67:89:ab to a network entity that originates the ARP request via a tunnel to the access device (e.g., access point or access network node) for that network entity. Note that the control information is not broadcast by the core network node, but instead sent to the appropriate access device via a tunnel. As a result, data packets destined to the IP address 192.168.10.1 are delivered to wired host device 281 based on the MAC address of wired host device 281 (i.e., MAC address 01:23:45:67:89:ab) being used as the destination MAC address in a header of the data packets.

In some other embodiments, an IP address of a network entity or a range of IP addresses of a group of network entities are associated with a MAC address of a routing device (e.g., core network node) in an entry of identifier table 600. In such embodiments, the IP address of the routing device may not be included in the IP address(es) in the entry of identifier table 600. The routing device, however, can be configured to forward data packets, which are destined to the range of IP addresses of the group of network entities, into the group of network entities, from which the data packets can be further forwarded to the destination. In other words, if a data packet destined to one of the group of network entities is received at a core network node that accesses or hosts identifier table 600, the data packet can be first delivered to the routing device based on the MAC address of the routing device being used as the destination MAC address in a header of the data packet, and then forwarded into the group of network entities by the routing device based on the destination IP address included in a header of the data packet.

For example, as shown in FIG. 2, identifier table 600 can be an identifier table implemented in or accessed by core network node 221, the IP address stored in the second entry of identifier table 600 can be associated with a group of network entities in network 201, and the MAC address stored in the second entry of identifier table 600 can be associated with core network node 222. Said in another way, the group of network entities in network 201 has a set of IP addresses 192.168.20.x, where "x" represents any integer number from 0 to 255, and core network node 222 has a MAC address 11:22:33:44:55:66. Furthermore, core network node 222 is configured to function as a router between the homogeneous enterprise network 200 and network 201. In other words, core network node 222 can forward packets from the homogeneous enterprise network 200 into network 201, and vice versa. When core network node 221 receives an ARP request requesting a MAC address associated with an IP address that falls into the range of 192.168.20.x, core network node 221 is configured to determine from identifier table 600 that the MAC address 11:22:33:44:55:66 is associated with such an IP address. Thus, core network node 221 is configured to send control information including the MAC address 11:22:33:44:55:66 to a network entity that originates the ARP request. As a result, data packets destined to the IP address that falls into the range of 192.168.20.x are first delivered to core network node 222 based on the MAC address of core network node 222 (i.e., MAC address 11:22:33:44:55:66) being used as the destination MAC address in a header of the data packets, and then forwarded into network 201 by core network node 222 based on the destination IP address in a header of the data packets being within the range of the IP addresses of network 201 (i.e., IP addresses 192.168.20.x).

In yet some other embodiments, an IP address of a network entity is not associated with any MAC address in identifier table 600. In such embodiments, as described with respect to FIG. 2, if a data packet destined to the IP address of the network entity is received at a core network node that accesses or hosts identifier table 600, the core network node can be configured to send a multicast request to a set of network entities whose IP addresses are not associated with any MAC address in identifier table 600, such that one network entity having the IP address may be identified. As a result, the MAC address of the identified network entity can be associated with the IP address and stored in identifier table 600. Furthermore, the data packet can be delivered to the network entity based on the MAC address of the network entity being used as the destination MAC address in a header of the data packet. Note that in this example, the core network node sends a multicast request to the set of network entities whose IP addresses are not associated with any MAC address in identifier table 600 without sending a multicast signal to the remaining network entities in identifier table 600 that are associated with an IP address.

For example, as shown in FIG. 2, identifier table 600 can be an identifier table implemented in core network node 221, and the IP address stored in the third entry of identifier table 600 can be associated with wireless host device 291. Said in another way, wireless host device 291 has an IP address of 192.168.10.100, and its MAC address is unknown to core network node 221. When core network node 221 receives an ARP request requesting a MAC address associated with the IP address 192.168.10.100, core network node 221 is configured to determine that no MAC address is associated with such an IP address in identifier table 600. Thus, core network node 221 is configured to send a multicast request to a set of network entities, including wireless host device 291, whose IP addresses are not associated with any MAC address in identifier table 600. In response to receiving the multicast request, wireless host device 291 is configured to send its MAC address to core network node 221. Thus, core network node 221 can provide the control information associated with the ARP request, including the MAC address of wireless host device 291, to a network entity that originates the ARP request. As a result, the MAC address of wireless host device 291 is inserted in the third entry of identifier table 600 (not shown in FIG. 6), and subsequently sent data packets destined to the IP address 192.168.10.100 are delivered to wireless host device 291 based on the MAC address of wireless host device 291 being used as the destination MAC address in a header of the data packets.

In some embodiments, a core network node that accesses or hosts identifier table 600 can be configured to maintain and update identifier table 600, including inserting a new entry of an IP address and/or a MAC address, modifying an IP address and/or a MAC address, deleting an entry, etc. As described with respect to FIG. 2, core network nodes of a homogeneous enterprise network can be configured to learn IP addresses and/or MAC addresses of associated network entities (e.g., host devices, routers, gateways, etc.) in the homogeneous enterprise network 200 via DHCP snooping and/or other IP packet snooping. Particularly, such DHCP snooping and/or other IP packet snooping is feasible for core network nodes of a homogeneous enterprise network because control traffic associated with DHCP requests and data packets are typically transmitted through core network nodes of the homogeneous enterprise network.

For example, as shown in FIG. 2, core network node 221 can learn the IP address and the MAC address of wired host device 281 by snooping the control information associated with a DHCP request originated at wired host device 281, which is retrieved by core network node 221 from a DHCP server operatively coupled to core network node 221. Thus, core network node 221 can be configured to insert a new entry including the IP address and the MAC address of wired host device 281 into identifier table 600 that is stored in or accessed by core network node 221. For another example, as shown in FIG. 2, core network node 221 can learn a change of the IP address of wireless host device 291 by snooping data packets of a session between wireless host device 291 and a network entity in network 201, which are transmitted through core network node 221. Thus, core network node 221 can be configured to update the IP address of wireless host device 291 in an entry of identifier table 600 that is stored in or accessed by core network node 221.

Figure 7:
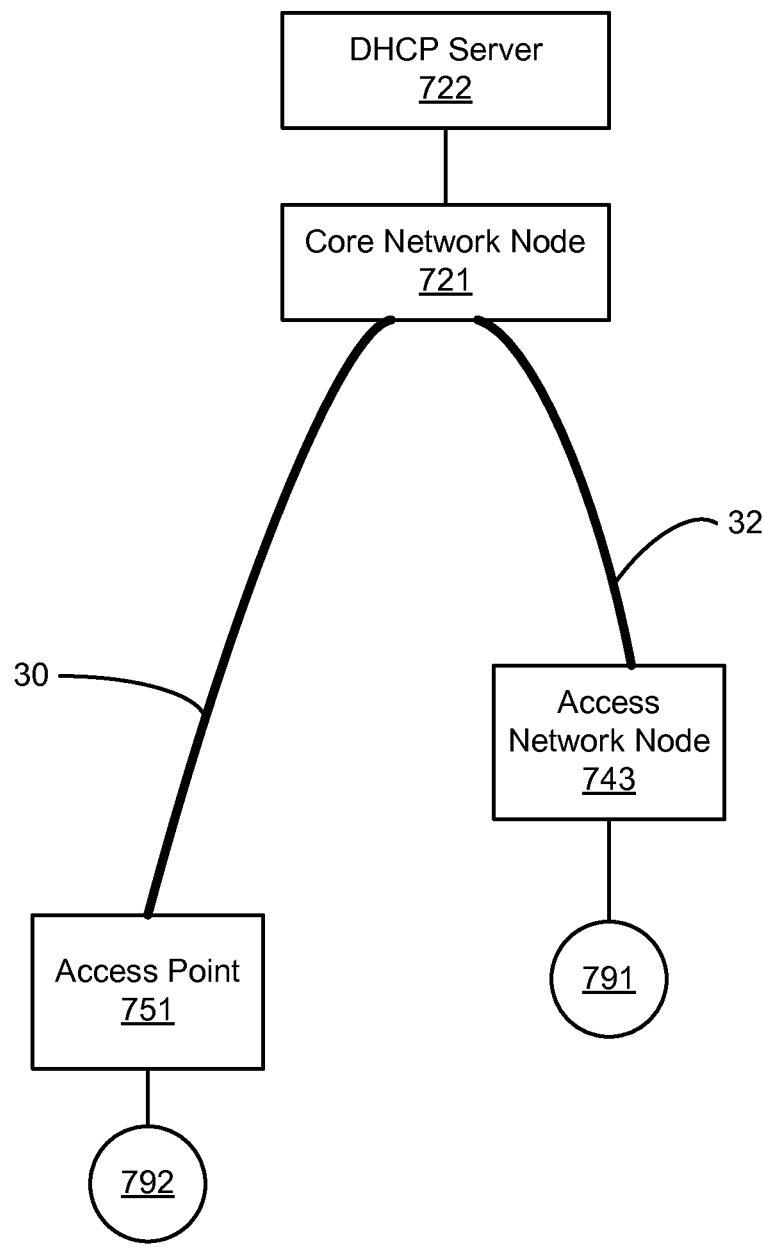
FIG. 7 is a schematic illustration of host devices obtaining IP addresses in a homogeneous enterprise network, according to an embodiment.

FIG. 7 is a schematic illustration of host devices (e.g., wired host device 791, wireless host device 792) obtaining IP addresses in a homogeneous enterprise network 700, according to an embodiment. As shown in FIG. 7, wired host device 791 is directly coupled to access network node 743, and wireless host device 792 is wirelessly coupled to access point 751. Both access network node 743 and access point 751 can be configured to communicate with core network node 721 via a tunnel (e.g., an Ethernet-over-layer-3 tunnel, a MPLS tunnel), respectively. Core network node 721 is operatively coupled to DHCP server 722 that can assign IP addresses to network entities in the homogeneous enterprise network 700. Note that the homogeneous enterprise network 700 can include other network devices not shown in FIG. 7 such as aggregation network nodes and access network nodes that may be operatively coupled to core network node 721, access point 751 and/or access network node 743.

Similar to the host devices in the homogeneous enterprise network 200 in FIG. 2, host devices in the homogeneous enterprise network 700 can obtain IP addresses from DHCP server 722 by communicating through core network node 721. Specifically, after wired host device 791 is initially coupled to access network node 743, wired host device 791 can originate and send a broadcast signal containing a DHCP request to access network node 743. After receiving the DHCP request, access network node 743 is configured to send the DHCP request to core network node 721 via a tunnel (shown as the tunnel represented by 32 in FIG. 7) through one or more intervening wired network nodes (e.g., an aggregation network node) (not shown in FIG. 7). This DHCP request, however, is not broadcast or sent to other network devices. In response to receiving the DHCP request via the tunnel, core network node 721 is configured to send a unicast signal to DHCP server 722 such that control information associated with the DHCP request, including an IP address assigned to wired host device 791, is retrieved from DHCP server 722 to core network node 721. Next, core network node 721 is configured to send the control information to access network node 743 via the tunnel, from which the control information is forwarded to wired host device 791. Thus, wired host device 791 obtains an IP address assigned from DHCP server 722.

Similarly, after wireless host device 792 is initially coupled to access point 751, wireless host device 792 can originate and send a broadcast signal containing a DHCP request to access point 751. After receiving the DHCP request, access point 751 is configured to send the DHCP request to core network node 721 via a tunnel (shown as the tunnel represented by 30 in FIG. 7) through one or more intervening wired network nodes (e.g., an access network node, an aggregation network node) (not shown in FIG. 7). This DHCP request, however, is not broadcast or sent to other network devices. In response to receiving the DHCP request via the tunnel, core network node 721 is configured to send a unicast signal to DHCP server 722 such that control information associated with the DHCP request, including an IP address assigned to wireless host device 792, is retrieved from DHCP server 722 to core network node 721. Next, core network node 721 is configured to send the control information to access point 751 via the tunnel, from which the control information is forwarded to wireless host device 792. Thus, wireless host device 792 obtains an IP address assigned from DHCP server 722.

Figure 8:
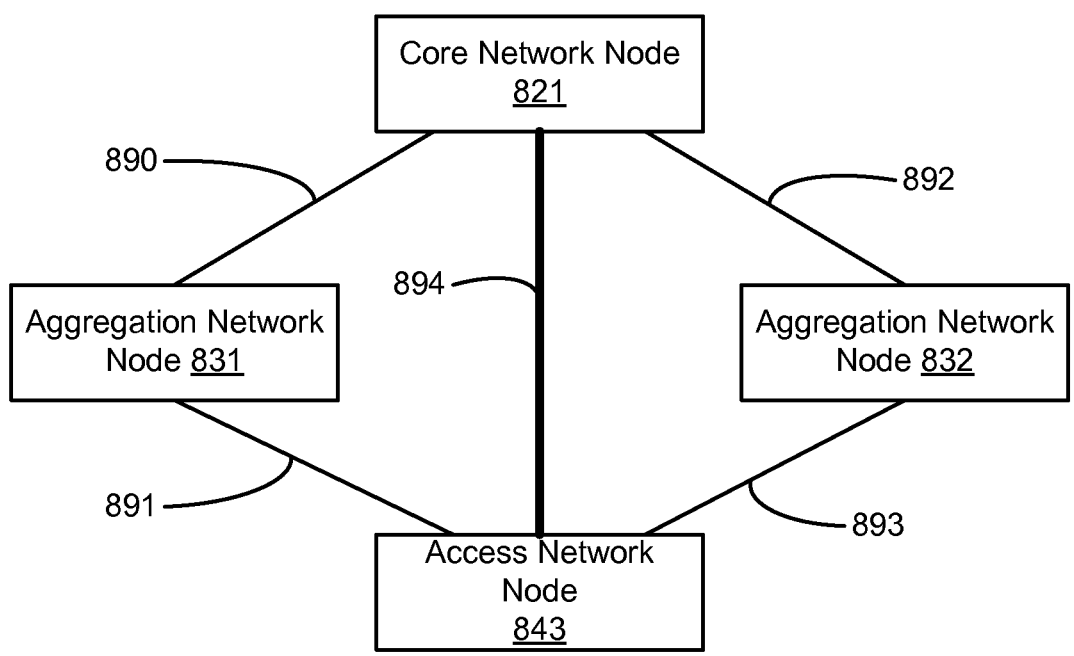
FIG. 8 is a schematic illustration of implementing a tunnel by using multi-path links in a homogeneous enterprise network, according to an embodiment.

FIG. 8 is a schematic illustration of implementing a tunnel by using redundant or multi-path links in a homogeneous enterprise network 800, according to an embodiment. As shown in FIG. 8, in the homogeneous enterprise network 800, access network node 843 is operatively coupled to core network node 821 via aggregation network node 831 and aggregation network node 832. To be specific, access network node 843 is directly coupled to aggregation network node 831 and aggregation network node 832 via link 891 and link 893, respectively. Aggregation network node 831 and aggregation network node 832 are directly coupled to core network node 821 via link 890 and link 892, respectively.

Redundant links within the homogeneous enterprise network 800, such as links 891-893 can be used to carry traffic by using an appropriate routing protocol such as those discussed herein using tunnels. According to such an appropriate routing protocol, each node within the homogeneous enterprise network 800 can compute all paths from itself to a final destination. In the example of FIG. 8, the core network node 821 can identify the multi-paths to access network node 843 (i.e., a path via links 890 and 891, and a path via links 892 and 893), and access network node 843 can identify the multi-paths to core network node 821 (i.e., a path via links 890 and 891, and a path via links 892 and 893). Thus, a packet can be sent, for example, from core network node 821 to access network node 843 (or vice versa) via either the path having links 890 and 891 or the path having links 892 and 893.

In some embodiments, when a spanning tree protocol (STP) is used, a link between two network devices in a homogeneous enterprise network can be blocked for transmitting traffic (e.g., data packets, control packets, etc.). For example, using STP, link 893 between access network node 843 and aggregation network node 832 can be blocked for transmitting traffic. In other words, when STP is used, packets sent from aggregation network node 832 to access network node 843 and/or traffic sent from access network node 843 to aggregation network node 832 is blocked from using link 893. In some embodiments, when using STP, traffic in both directions (e.g., traffic sent from and traffic sent to access network node 843) can be blocked. In some other embodiments, using STP, only traffic in one of the two directions (e.g., traffic sent from or traffic sent to access network node 843) can be blocked.

In some embodiments, an internet protocol (IP) routing protocol, such as, for example, Intermediate System To Intermediate System (IS-IS), can be used instead of STP. In such embodiments, a redundant link between two network devices in a homogeneous enterprise network that would otherwise be blocked for transmitting traffic using STP can be allowed to transmit tunneled traffic and/or non-tunneled traffic (e.g., data packets, control packets, etc.). For example, as shown in FIG. 8, both link 891 and link 893 can be allowed to transmit traffic. In some embodiments, equal-cost multi-path (ECMP) for IP or MPLS can be used when an IP routing protocol is used instead of STP. In other embodiments, traffic engineering (TE) for MPLS can be used when an IP routing protocol is used instead of STP.

In some embodiments, traffic sent from the access network node 843 to the core network node 821 (via aggregation network node 831 or 832) can be tunneled. For example, such traffic can be tunneled using any suitable tunnel, such as, for example, an MPLS tunnel, an Ethernet-over-layer-3 tunnel, and/or the like. For example, the tunnel between access network node 843 and core network node 821 (shown as the tunnel represented by 894 in FIG. 8) includes two separate paths, one path via aggregation network node 831 and the other path via aggregation network node 832. Similarly stated, tunneled traffic (e.g., associated with the MPLS protocol) can be transmitted between access network node 843 and core network node 821 via aggregation network node 831 (i.e., through link 890 and link 891) or via aggregation network node 832 (i.e., through link 892 and link 893).

Because routing protocols used for tunneling within a homogeneous enterprise network do not converge instantly, a possibility exists that forwarding loops could be formed within the network without a mechanism to prevent such forwarding loops. If such forwarding loops were allowed to persist, packets sent within the network could be looped indefinitely. Instead, a mechanism to prevent such forwarding loops can be used to ensure that any transient loops within the network does not result in indefinite packet forwarding. For example, when tunnels are based on the MPLS protocol, the MPLS labels that include a time-to-live (TTL) byte can be used. When tunnels are based on other protocols, similar time-to-live mechanisms can be used.

In some embodiments, only traffic that is tunneled based on one or more predetermined tunneling protocols can be allowed to be transmitted through a redundant link (e.g., via both link 891 and link 893). In the example of FIG. 8, only traffic that is tunneled based on the MPLS protocol, but not traffic that is tunneled based on an Ethernet-over-layer-3 tunneling protocol (e.g., CAPWAP, GRE), can be transmitted through link 893. For another example, in other embodiments, only traffic that is tunneled based on an Ethernet-over-layer-3 tunneling protocol, but not traffic that is tunneled based on an MPLS tunneling protocol, can be transmitted through link 893.

In some embodiments, tunneled traffic is allowed to be transmitted through a redundant link (e.g., via both link 891 and link 893) if the tunneled traffic is originated at or destined to at least one of the two end entities of the link. In the example of FIG. 8, traffic tunneled between core network node 821 and access network node 843 can be transmitted through link 893 if access network node 843 is the source or destination of the tunneled traffic. This example would include a tunnel associated with a wired host device (not shown in FIG. 8) directly coupled to access network node 843, but not a tunnel associated with an access point directly coupled to access network node 843 and wirelessly coupled to a wireless host device. Note that aggregation network node 832 cannot be a source or destination of the tunneled traffic between core network node 821 and access network node 843. In other embodiments, tunneled traffic is allowed to be transmitted through a redundant link (e.g., via both link 891 and link 893) regardless of the origination node and/or destination node. Thus, in such embodiments, an access point directly coupled to access network node can transmit traffic over either link 891 and/or link 893. In some embodiments, entropy labels can be used to route traffic over both link 891 and link 893.

In some embodiments, a redundant link can be allowed for transmitting tunneled traffic only if the link is included in a path of equal-cost multi-path (ECMP); otherwise the link can be blocked for transmitting tunneled traffic. For example, as shown in FIG. 8, link 893 is included in an ECMP path that connects core network node 821 and access network node 843 via aggregation network node 832 (i.e., via link 892 and link 893), which has an equal cost as the other ECMP path that connects core network node 821 and access network node 843 via aggregation network node 831 (i.e., via link 890 and link 891). Therefore, link 893 can be allowed for transmitting tunneled traffic. In some embodiments, a cost of a path can be determined based on a bandwidth of the path, a number of nodes included in or traversed by the path, a time to transmit a data packet via the path, and/or the like.

In other embodiments, a redundant link can be allowed to transmit tunneled traffic even if the link is included in a higher-cost multi-path. For example, in such embodiments, MPLS can be used to tunnel traffic from an access network node to a core network node. In such embodiments, traffic engineering (TE) can be used to allow the tunnel to include a first path having a first cost between the access network node and the core network node and a second path having a second cost between the access network node and the core network node different than the first cost. For example, a tunnel can include a first path that includes a single node between the access network node and the core network node, and a second path that includes multiple nodes between the access network node and the core network node. In such an example, the first path can have a lower cost than the second path. In such embodiments, however, tunneled traffic can be sent between the access network node and the core network node via both the first path and the second path. Thus, packets can be tunneled from the access network node to the core network node (or vice versa) via two or more paths having different costs.

Figure 9:
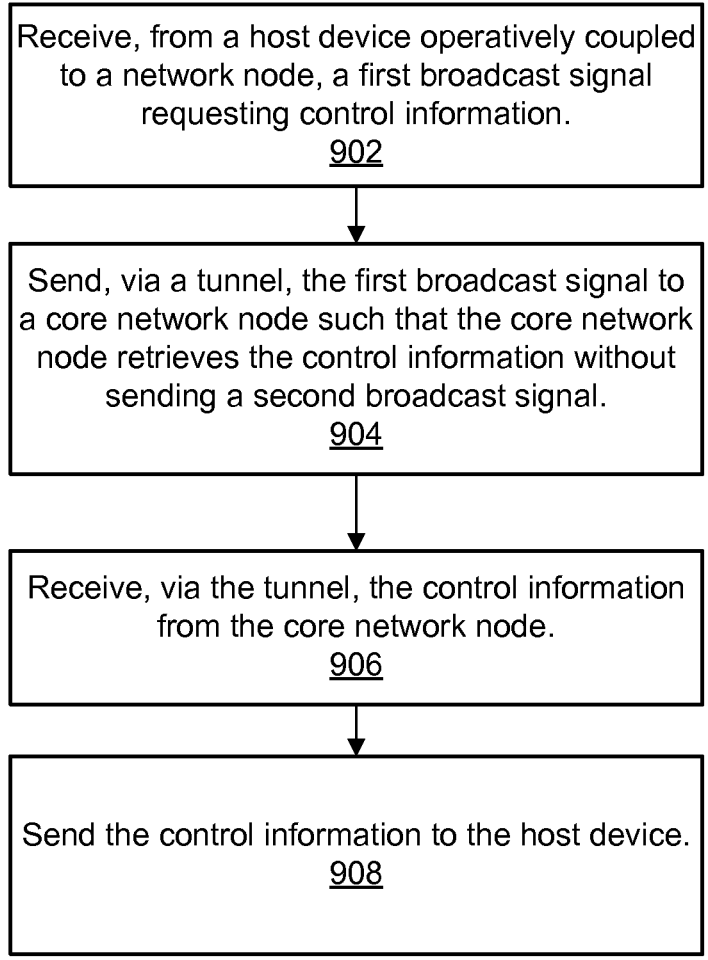
FIG. 9 is a flow chart of a method for retrieving and delivering control information in a homogeneous enterprise network, according to an embodiment.

FIG. 9 is a flow chart of a method for retrieving and delivering control information in a homogeneous enterprise network, according to an embodiment. At 902, a broadcast signal requesting control information can be received at a network node from a host device operatively coupled to the network node. Specifically, the broadcast signal can be a DHCP request that requests control information such as an IP address assigned to the host device, an ARP request that requests control information such as a MAC address associated with an IP address included in the ARP request, etc. The network node can be an access network node directly coupled to a wired host device, or an access point wirelessly coupled to a wireless host device. In the example of FIG. 7, in connection with sending data packets to wireless host device 792, access network node 743 is configured to receive a broadcast signal originated and sent by wired host device 791, which is an ARP request requesting a MAC address associated with an IP address of wireless host device 792.

At 904, the broadcast signal can be sent from the network node to a core network node via a tunnel, such that the core network node retrieves the control information without sending another broadcast signal. Specifically, the tunnel can be an Ethernet-over-layer-3 tunnel, a MPLS tunnel, etc. In some embodiments, the core network node can be configured to retrieve the control information from a server device (e.g., a DHCP server) operatively coupled to the core network node by sending a unicast signal to the server device. In some other embodiments, the core network node can be configured to retrieve the control information from a data structure (e.g., a table, a database) stored in or accessed by the core network node. In the example of FIG. 7, after receiving the ARP request from wired host device 791, access network node 743 can be configured to send the ARP request to core network node 721 via a tunnel (shown as the tunnel represented by 32 in FIG. 7), such that core network node 721 retrieves a MAC address associated with the IP address included in the ARP request from an identifier table stored in core network node 721. In other words, core network node 721 retrieves the MAC address of wireless host device 792 without sending another broadcast signal.

At 906, the control information can be received at the network node via the tunnel from the core network node. Specifically, the network node can be configured to receive the control information from the core network node via the same tunnel that is used to send the broadcast signal from the network node to the core network node. Alternatively, the control information can be received via another tunnel from the core network node to the network node. In the example of FIG. 7, after retrieving the control information including the MAC address of wireless host device 792, access network node 743 can be configured to receive the control information from core network node 721 via the same tunnel (shown as the tunnel represented by 32 in FIG. 7) that is used to send the ARP request from access network node 743 to core network node 721.

At 908, the control information can be sent from the network node to the host device. In the example of FIG. 7, after receiving the control information including the MAC address of wireless host device 792 from core network node 721, access network node 743 can be configured to send the control information to wired host device 791. Thus, the control information can be applied accordingly at wired host device 791. As a result, the MAC address of wireless host device 792 is used as the destination MAC address in a header of data packets destined to wireless host device 792 from wired host device 791.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

While shown and described above with respect to FIG. 2 as DHCP requests and/or ARP requests being handled by core network nodes without being broadcast in an enterprise network, in other embodiments, other broadcast signals can also be handled by core network nodes without being broadcast in the enterprise network. For example, inverse address resolution protocol (InARP) requests that request an IP address associated with a MAC address can also be handled by a core network node without being broadcast in an enterprise network. Similar to handing an ARP request, in response to receiving an InARP request from a network entity via a tunnel, a core network node can be configured to retrieve control information associated with the InARP request without sending a broadcast signal, and send the retrieved control information to the network entity via the tunnel.

While shown and described above with respect to FIG. 1 and FIG. 2 as the control information associated with a DHCP request including an IP address, a lease, a subnet mask, and/or a default gateway IP address, etc., in other embodiments, other control information related to IP configuration can also be optionally included in the control information associated with a DHCP request. For example, the control information associated with a DHCP request can include an IP address of a controller (e.g., a core network node). For another example, the control information associated with a DHCP request can include an IP address of local caching domain name server (DNS) resolvers. In addition, similar to a DHCP request, while shown and described above with respect to FIG. 1 and FIG. 2 as the control information associated with an ARP request including a MAC address associated with an IP address, in other embodiments, other control information related to the associations of MAC addresses with IP addresses can also be optionally included in the control information associated with an ARP request.

While shown and described above with respect to FIG. 5 as identifier table 512 being included in memory 510 within core network node 500, in other embodiments, an identifier table can be located in a memory separate from and operatively coupled to a core network node. In some embodiments, an identifier table can be located in a memory within a separate device that is operatively coupled to a core network node. In such embodiments, the core network node can be configured to access the memory that hosts the identifier table to retrieve and/or update control information such as MAC addresses and/or IP addresses stored in the identifier table. For example, a processor (e.g., processor 520 in FIG. 5) of the core network node can be configured to send a unicast signal containing an IP address to the device with the memory that hosts the identifier table, such that control information including a MAC address associated with the IP address can be retrieved from the identifier table and sent to the core network node. For another example, a control module (e.g., control module 524 in FIG. 5) of the core network node can be configured to send a control signal to the device with the memory that hosts the identifier table, instructing an entry including an IP address and/or a MAC address stored in the identifier table to be modified.

While shown and described above with respect to FIG. 5 as control module 524 being included in core network node 500, in other embodiments, a control module can be separate from and operatively coupled to a core network node. In some embodiments, a control module can be located on a separate device that is operatively coupled to a core network node. In such an example, the control module can be configured to manage wired and/or wireless sessions and apply user policies to wired and/or wireless sessions by sending signals (e.g., control signals) to and receiving signals from the core network node. For example, the control module can send a control signal to an tunnel module in the core network node, instructing the tunnel module to encapsulate or decapsulate a received packet, according to a predetermined tunneling protocol (e.g., an Ethernet-over-layer-3 tunneling protocol, the MPLS protocol). For another example, the control module can send a control signal to a processor of the core network node, instructing the processor to compare information associated with a user session with data stored in a policy table within the core network node, such that an appropriate user policy can be determined and applied on the user session.

While shown and described above with respect to FIG. 8 as a tunnel between an access network node and a core network node including multiple paths, in other embodiments, tunnels between other types of network devices can also include multiple paths. For example, a tunnel between an access point and a core network node can include multiple paths. The access point can be configured to send a broadcast signal to the core network node via one path from the multiple paths included within the tunnel, and the core network node can also send control information associated with the broadcast signal to the access point via one path from the multiple paths in a similar way.

While shown and described above with respect to FIG. 1 as aggregation network nodes 131-132 with their associated access network nodes 141-144 and access points 151-152 comprising a pod, in other embodiments, a pod can include less than two or more than two aggregation network nodes and their associated access devices (e.g., access network nodes, access points). As described herein, a pod is defined as a collection of aggregation network nodes and associated access devices having a common connection to a redundant set of core network nodes. Furthermore, while shown and described above with respect to FIGS. 1, 2, 7 and 8 as a redundant set of core network nodes connected to a pod including two core network nodes, in other embodiments, such a redundant set of core network nodes can include more than two core network nodes. For example, a cluster of any number (e.g., 3, 4, 5, etc.) of core network nodes can be coupled to a pod of aggregation network nodes and their associated access devices. Each core network node in the cluster of core network nodes can function as a controller, a hop and/or a switch for the network devices included in the pod associated with the cluster of core network nodes.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

The invention claimed is:

1. An apparatus, comprising:
a network node configured to be included in a pod of network nodes including a plurality of network nodes operatively coupled to a core network node, each network node in the pod of network nodes being operatively coupled to a redundant set of core network nodes associated with a first set of redundant links, the network node configured to receive a first packet and a second packet from a host device operatively coupled to the network node,
the network node configured to send the first packet to the core network node via a first path of a tunnel between the network node and the core network node when the first packet includes a destination address of a network device outside of the pod, the first path of the tunnel having a cost and being associated with the first set of redundant links, the first path of the tunnel selected based on the destination address of the first packet,
the network node configured to send the second packet to the core network node via a second path of the tunnel when the second packet includes a destination address of a network device outside of the pod of network nodes operatively coupled to the redundant set of core network nodes, the second path having a cost different than the cost of the first path and being associated with a second set of redundant links, the second path of the tunnel selected based on the destination address of the second packet.

2. The apparatus of claim 1, wherein the network node is an access network node and the host device is a wired host device, the access network node configured to be directly coupled to the wired host device.

3. The apparatus of claim 1, wherein the network node is a wireless access point and the host device is a wireless host device, the wireless access point configured to be wirelessly coupled to the wireless host device.

4. The apparatus of claim 1, wherein the first packet is one of an address resolution protocol (ARP) request, a dynamic host configuration protocol (DHCP) request, or a neighbor discovery (ND) request,
the first path including at least one intervening network node from the plurality of network nodes between the core node and the network node and excluding remaining network nodes from the plurality of network nodes, the network node configured to send the first packet such that the remaining network nodes from the plurality of network nodes do not receive the first packet.

5. The apparatus of claim 1, wherein the network node is configured to receive control information in response to the core network node retrieving the control information based on the first packet.

6. The apparatus of claim 1, wherein the first path includes a first number of network nodes from the plurality of network nodes, the second path includes a second number of network nodes from the plurality of network nodes different than the first number.

7. The apparatus of claim 1, wherein the first path is associated with a bandwidth, the second path is associated with a bandwidth different than the bandwidth of the first path.

8. The apparatus of claim 1, wherein the first set of redundant links is collectively configured to transmit traffic tunneled based on a first tunneling protocol with a time-to-live (TTL) mechanism.

9. The apparatus of claim 1, wherein the pod includes an aggregation network node operatively coupled between the core network node and the network node.

10. An apparatus, comprising:
a network node configured to be (1) operatively coupled to a set of host devices without an intervening switch and (2) included in a pod of network nodes, each network node in the pod of network nodes being operatively coupled to a redundant set of core network nodes associated with a first set of redundant links, the network node configured to be operatively coupled to a core network node,
the network node configured to receive a first packet from a first host device from the set of host devices, the network device configured to send the first packet to a second host device from a set of host devices connected to the redundant set of core network nodes via a first path including the first set of redundant links and not including the core network node, when the first packet includes a destination address of the second host device from the set of host devices connected to the redundant set of core network nodes, the network node configured to receive a second packet from the first host device from the set of host devices, the network node configured to send the second packet to the core network node via a tunnel between the network node and the core network node when the second packet includes a destination address of a host device not within the set of host devices connected to the redundant set of core network nodes, the tunnel including a second path, the second path including a second set of redundant links and having a cost different than a cost of the first path.

11. The apparatus of claim 10, wherein the network node is configured to store an identifier associated with each host device from the set of host devices and an identifier associated with the core network node.

12. The apparatus of claim 10, wherein the network node is configured to be included in a plurality of network nodes operatively coupled to the core network node, the network node being operatively coupled to the host device not within the set of host devices via at least one other network node from the plurality of network nodes.

13. The apparatus of claim 10, wherein the network node is configured to send the second packet to the core network node via the tunnel that includes at least one intervening switch between the core network node and the network node.

14. The apparatus of claim 10, wherein the tunnel is one of a multiprotocol label switching (MPLS) tunnel or an Ethernet-over-layer-3 tunnel.

15. A non-transitory processor-readable medium storing code representing instructions to cause a processor to:

receive, at a network node, a first packet from a first host device from a set of host devices included in a pod of network nodes and operatively coupled to the network node without an intervening switch, the first packet being addressed to a second host device included in the pod of network nodes, each network node in the pod of network nodes being operatively coupled to a first redundant set of core network nodes associated with a first set of redundant links;

receive, at the network node, a second packet from the first host device, the second packet being addressed to a host device not within the pod of network nodes;

send the first packet to the second host device via a first path not including a core network node operatively coupled to the network node, based on the first packet including a destination address of the second host device included in the pod of network nodes, the first path selected based on the destination address of the first packet; and send the second packet to the core network node via a tunnel based on the second packet including a destination address of the host device not within the pod of network nodes operatively coupled to the first redundant set of core network nodes, the tunnel including a second path that includes a second set of redundant links and has a cost different than a cost of the first path, the second path selected based on the destination address of the second packet.

16. The non-transitory processor-readable medium of claim 15, wherein the tunnel includes at least one intervening switch between the core network node and the network node.

17. The non-transitory processor-readable medium of claim 15, wherein the tunnel is one of a multiprotocol label switching (MPLS) tunnel or an Ethernet-over-layer-3 tunnel.

18. The non-transitory processor-readable medium of claim 15, wherein the code to cause the processor to send the first packet includes code to cause the processor to send the first packet to the second host device based on an identifier associated with the second host device stored at the network node, the code to cause the processor to send the second packet includes code to cause the processor to send the second packet to the core network node based on an identifier associated with the tunnel stored at the network node.

* * * * *